United States Patent
Kurani et al.

(10) Patent No.: US 11,238,442 B1
(45) Date of Patent: Feb. 1, 2022

(54) CLOUD BASED MOBILE WALLET PROFILE

(71) Applicant: Wells Fargo Bank, N.A., San Francisco, CA (US)

(72) Inventors: Ashish B. Kurani, Hillsborough, CA (US); Steven E. Puffer, Champlin, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 321 days.

(21) Appl. No.: 15/432,661

(22) Filed: Feb. 14, 2017

Related U.S. Application Data

(60) Provisional application No. 62/378,636, filed on Aug. 23, 2016.

(51) Int. Cl.
*G06Q 20/36* (2012.01)

(52) U.S. Cl.
CPC .................. *G06Q 20/363* (2013.01)

(58) Field of Classification Search
CPC .. G06Q 20/36; G06Q 20/3674; G06Q 20/322; G06Q 20/40; G06Q 20/363; H04W 12/06; H04W 12/08; G06F 21/31; G06F 21/45
USPC ......................................................... 705/41
See application file for complete search history.

(56) References Cited

U.S. PATENT DOCUMENTS

| | | |
|---|---|---|
| 7,716,134 B2 | 5/2010 | Black et al. |
| 7,766,223 B1 | 8/2010 | Mello et al. |
| 7,822,688 B2 | 10/2010 | Ladrou et al. |
| 8,118,218 B2 | 2/2012 | Koh et al. |
| 8,190,527 B2 | 5/2012 | Stanley |
| 8,306,916 B2 | 11/2012 | Romagnoli et al. |
| 8,458,781 B2 | 6/2013 | Radhakrishnan |
| 8,489,067 B2 | 7/2013 | Rackley, III et al. |
| 8,606,720 B1 | 12/2013 | Baker et al. |
| 8,615,466 B2 | 12/2013 | Aiglstorfer et al. |
| 8,725,632 B2 | 5/2014 | Tompkins et al. |
| 8,751,397 B2 | 6/2014 | Stanley |
| 8,763,896 B2 | 7/2014 | Kushevsky et al. |
| 8,793,192 B2 | 7/2014 | Hammad et al. |

(Continued)

OTHER PUBLICATIONS

Wikipedia, "Digital Wallet," https://en.wikipedia.org/w/index.php?title=Digital_wallet&oldid=727738656. (Year: 2016).

(Continued)

*Primary Examiner* — Shahid Merchant
*Assistant Examiner* — Michael J Warden
(74) *Attorney, Agent, or Firm* — Foley & Lardner LLP

(57) ABSTRACT

A method for separately registering a user and a mobile device for use of a mobile wallet account includes registering, by a registration terminal of a mobile wallet provider, a user for use of the mobile wallet account, including assigning one or more user-provided settings to the mobile wallet account. The method also includes receiving, by a computing system of the mobile wallet provider, a request from a mobile device to register the mobile device for use as a mobile wallet, identifying, by the computing system, the mobile wallet account of the registered user based on the request, and registering, by the computing system, the mobile device for use of the identified mobile wallet account, including associating the one or more user-provided settings with use of the mobile device.

14 Claims, 21 Drawing Sheets

(56) References Cited

U.S. PATENT DOCUMENTS

| | | | |
|---|---|---|---|
| 8,843,125 B2 | 9/2014 | Kwon et al. | |
| 8,918,855 B2 | 12/2014 | Singh et al. | |
| 9,092,776 B2 | 7/2015 | Dessert | |
| 9,098,846 B2 | 8/2015 | Gill et al. | |
| 9,154,903 B2 | 10/2015 | Adams et al. | |
| 9,191,813 B2 | 11/2015 | Lim et al. | |
| 9,218,624 B2 | 12/2015 | Moghadam | |
| 9,240,009 B2 | 1/2016 | Koh et al. | |
| 9,292,849 B2 | 3/2016 | Kurian | |
| 9,355,391 B2 | 5/2016 | Von Behren et al. | |
| 9,355,393 B2 | 5/2016 | Purves et al. | |
| 9,412,106 B2 | 8/2016 | Laracey | |
| 9,424,572 B2 | 8/2016 | Bondesen et al. | |
| 9,454,754 B2 | 9/2016 | Head et al. | |
| 9,454,758 B2 | 9/2016 | Desai et al. | |
| 9,460,432 B2 | 10/2016 | Chintakayala | |
| 2010/0088313 A1* | 4/2010 | Hoffman | G06F 16/22 707/733 |
| 2010/0125495 A1* | 5/2010 | Smith | G06Q 40/02 705/14.23 |
| 2010/0125510 A1* | 5/2010 | Smith | G06Q 20/105 705/17 |
| 2011/0113022 A1* | 5/2011 | Polychronidis | H04L 67/306 707/705 |
| 2012/0284195 A1 | 11/2012 | McMillen et al. | |
| 2012/0310824 A1 | 12/2012 | Liberty | |
| 2013/0041817 A1 | 2/2013 | Greenwald et al. | |
| 2013/0054336 A1 | 2/2013 | Graylin | |
| 2013/0054454 A1 | 2/2013 | Purves et al. | |
| 2013/0124349 A1 | 5/2013 | Khan et al. | |
| 2013/0179341 A1 | 7/2013 | Boudreau | |
| 2013/0191227 A1 | 7/2013 | Pasa et al. | |
| 2013/0246261 A1* | 9/2013 | Purves | G06Q 20/105 705/41 |
| 2013/0262302 A1 | 10/2013 | Lettow et al. | |
| 2013/0282588 A1 | 10/2013 | Hruska | |
| 2013/0317928 A1* | 11/2013 | Laracey | G06Q 20/322 705/21 |
| 2014/0006278 A1 | 1/2014 | Sathe et al. | |
| 2014/0074655 A1 | 3/2014 | Lim et al. | |
| 2014/0156505 A1 | 6/2014 | Warshawsky et al. | |
| 2014/0156506 A1 | 6/2014 | Grigg et al. | |
| 2014/0188704 A1 | 7/2014 | Grossman et al. | |
| 2014/0188719 A1 | 7/2014 | Poornachandran et al. | |
| 2014/0195426 A1 | 7/2014 | Caldwell | |
| 2014/0207668 A1 | 7/2014 | Hermansen et al. | |
| 2014/0229375 A1 | 8/2014 | Zaytzsev et al. | |
| 2014/0279559 A1 | 9/2014 | Smith et al. | |
| 2014/0281875 A1* | 9/2014 | Branton | G06F 40/169 715/230 |
| 2014/0289061 A1 | 9/2014 | Zenou | |
| 2014/0297524 A1 | 10/2014 | Ravindranath et al. | |
| 2014/0337236 A1 | 11/2014 | Wong et al. | |
| 2014/0344153 A1 | 11/2014 | Raj et al. | |
| 2015/0012427 A1 | 1/2015 | Phillips et al. | |
| 2015/0019417 A1 | 1/2015 | Andrews et al. | |
| 2015/0058216 A1 | 2/2015 | Luciani | |
| 2015/0073996 A1 | 3/2015 | Makhotin et al. | |
| 2015/0100486 A1 | 4/2015 | Green et al. | |
| 2015/0121405 A1* | 4/2015 | Ekselius | G06Q 20/32 725/5 |
| 2015/0127529 A1 | 5/2015 | Makhotin et al. | |
| 2015/0140960 A1 | 5/2015 | Powell et al. | |
| 2015/0170137 A1 | 6/2015 | Balbus | |
| 2015/0186871 A1 | 7/2015 | Laracey | |
| 2015/0220914 A1 | 8/2015 | Purves et al. | |
| 2015/0254698 A1 | 9/2015 | Bondesen et al. | |
| 2015/0287017 A1 | 10/2015 | Iqbal et al. | |
| 2015/0339640 A1 | 11/2015 | Kim et al. | |
| 2015/0348025 A1 | 12/2015 | Brown et al. | |
| 2015/0348182 A1 | 12/2015 | Cismas et al. | |
| 2015/0356560 A1 | 12/2015 | Shastry et al. | |
| 2015/0365787 A1* | 12/2015 | Farrell | H04W 4/029 455/456.1 |
| 2016/0034891 A1 | 2/2016 | Carpenter et al. | |
| 2016/0055511 A1 | 2/2016 | Chidella et al. | |
| 2016/0078434 A1 | 3/2016 | Huxham et al. | |
| 2016/0092867 A1* | 3/2016 | Salama | G06Q 20/42 705/41 |
| 2016/0224977 A1* | 8/2016 | Sabba | G06Q 20/385 |
| 2016/0267459 A1 | 9/2016 | Metral | |
| 2016/0267461 A1 | 9/2016 | Chang | |
| 2016/0292673 A1 | 10/2016 | Chandrasekaran | |
| 2016/0379220 A1* | 12/2016 | Tunnell | G06Q 20/40145 705/71 |
| 2017/0109745 A1* | 4/2017 | Al-Bedaiwi | G06Q 20/401 |
| 2017/0132630 A1 | 5/2017 | Castinado et al. | |

OTHER PUBLICATIONS

Wikipedia, "Web Browser," https://en.wikipedia.org/w/index.php?title=Web_browser&oldid=732187623. (Year: 2016).

Wikipedia, "Web Portal," https://en.wikipedia.org/w/index.php?title=Web_portal&oldid=731813751. (Year: 2016).

Johannes, Sang et al., "Business Models for NFC Based Mobile Payments," Journal of Business Models, vol. 3, No. 1, (2015), pp. 29-48.

* cited by examiner

CLOUD BASED MOBILE WALLET PROFILE

CROSS-REFERENCE TO RELATED APPLICATIONS

This application claims priority to U.S. Provisional Patent Application No. 62/378,636 entitled "SYSTEMS AND METHODS FOR MULTI-CHANNEL ONBOARDING OF A MOBILE WALLET," by Ashish B. Kurani, filed on Aug. 23, 2016, which is herein incorporated by reference in its entirety and for all purposes.

BACKGROUND

Users of mobile computing devices are able to complete various financial transactions through their mobile computing devices. The users may set up their mobile computing devices to organize and selectively exchange payment information with transaction terminals, and with each other, in the absence of physical payment cards. Payment information may be managed by various software programs, including using "mobile wallets" offered by mobile wallet providers that include mobile device manufacturers, financial institutions, and other third party software developers. Such mobile wallets are implemented on the users' mobile computing devices by registration with the mobile wallet providers via the mobile computing devices.

SUMMARY OF THE INVENTION

One embodiment of the present disclosure relates to a method performed by a mobile wallet provider. The method includes registering, by a registration terminal operated by the mobile wallet provider, a user for use of a mobile wallet account, including assigning one or more user-provided settings to the mobile wallet account, receiving, by a computing system of the mobile wallet provider, a request from a mobile device to register the mobile device for use as a mobile wallet, identifying, by the computing system, the mobile wallet account of the registered user based on the request, and registering, by the computing system, the mobile device for use of the identified mobile wallet account, including associating the one or more user-provided settings with use of the mobile device Another embodiment of the present disclosure relates to a method performed by a mobile wallet provider. The method includes receiving, by a computing system of the mobile wallet provider, a request to register a user, providing, by the computing system, a user registration interface at a registration terminal, the user registration interface configured to enable communication with the mobile wallet provider, receiving, by the user registration interface, one or more account settings from the user, registering, by the computing system, the user for use of a mobile wallet account, including generating the mobile wallet account based on the one or more account settings, and registering, by the computing system, a mobile device for use of the mobile wallet account, including associating the one or more account settings with use of the mobile device, wherein the mobile device is separate and distinct from the registration terminal.

Another embodiment of the present disclosure relates to a method performed by a financial institution providing one or more payment accounts to a user. The method includes registering, by a registration terminal operated by the financial institution, the user for use of a mobile wallet account, including assigning a user-selected access code and one or more user-provided settings to the mobile wallet account, providing, by a computing system of the financial institution, a mobile banking interface to a mobile device of the user, receiving, by the computing system, authentication credentials from the user via the mobile banking interface, identifying, by the computing system, the mobile wallet account of the registered user based on the authentication credentials, and registering, by the computing system, the mobile device for use of the mobile wallet account based on receipt of the access code via the mobile banking interface, including associating the one or more user-provided settings with use of the mobile device.

Another embodiment of the present disclosure relates to a method performed by a mobile wallet provider. The method includes generating, by a computing system of the mobile wallet provider, a user profile for a mobile wallet account based on information received from a user of a first mobile device, registering, by the computing system, a first mobile device for use of the mobile wallet account, including applying the user profile to the first mobile device, registering, by the computing system, a second mobile device for use of the mobile wallet account, and upon registration of the second mobile device, automatically applying the user profile to the second mobile device.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Figure 1:
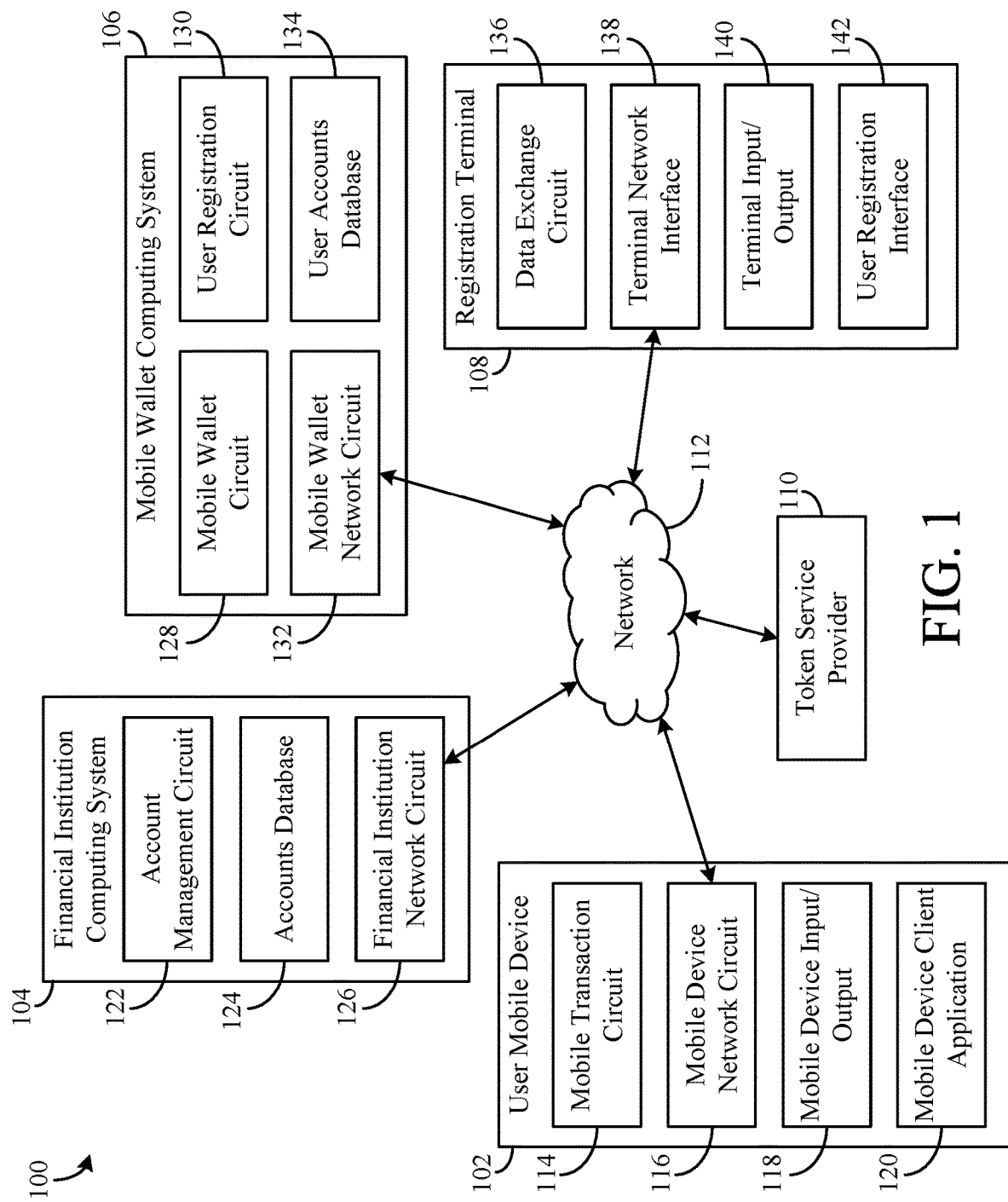
FIG. 1 is a schematic diagram of a mobile wallet registration system, according to an example embodiment.

Various embodiments discussed herein relate to systems and methods for separately registering a user and a mobile device for use of a mobile wallet account. In some embodiments, the user and the mobile device are registered by devices that are separate and distinct from each other. In some embodiments, the user and the mobile device are registered using the same device, but from communication channels that are separate and distinct. The user is first registered for use of a mobile wallet account using a registration terminal that enables communication with a mobile wallet provider. The user may provide one or more settings and preferences associated with the mobile wallet account, including selection of one or more source payment accounts, a default payment account, and a wallet access code, and acceptance of the associated terms and conditions. The mobile device is then registered for use of the mobile wallet account of the registered user. The user sends a request to the mobile wallet provider, which may include information identifying the registered user. The mobile wallet provider may then register the mobile device and apply any settings and preferences determined during user registration.

For example, a user may register for a mobile wallet account with an issuing financial institution when opening an eligible payment account at a branch location. For example, a user may be at a branch location opening up a new credit card account, a new checking account, and/or another account. Alternatively, the user may be at the branch location conducting other transactions, and the banker may alert the user to the opportunity of registering for a mobile wallet account. The user may be notified by the issuing financial institution (e.g., via interaction with a banker, via a customer interface, etc.) that one or more accounts of the user are eligible for use in a mobile wallet account and may be provided with an offer to register for a mobile wallet account via a registration terminal at the branch location. For example, the banker may say to the user, "Your (new) account is eligible to be used in a mobile wallet account. Would you like to register now?" Assuming the user wishes to register, the user may then provide any required information, including mobile wallet user preferences. In some embodiments, the registration for the mobile wallet account may be performed via the user's mobile device (i.e., the registration terminal is the mobile device), and the banker may verbally guide the user through the account registration process. In other embodiments, the registration for the mobile wallet account may be performed via a banker terminal (i.e., the registration terminal is the banker terminal), and the banker may use the banker terminal to complete the account registration process. For example, if the user opened both a new credit card account and a new checking card (with an associated debit card), the user may be asked, "Which account would you like to use a your default payment account for your mobile wallet?" The user may then separately/subsequently register a mobile device for use of the mobile wallet account by communicating with the issuing financial institution using the mobile device. For example, the user may be sent a link to install or access a mobile wallet application. When the user accesses the mobile wallet application, the user preferences previously specified by the user may be immediately reflected in the mobile wallet application, e.g., without requiring further inputs from the user within the mobile wallet application to specify such preferences. In some situations, a user may find it easier to specify such preferences via a banker using a computer at a branch location than via a user interface provided by the mobile device, given the limited display size and keyboard constraints of the mobile device.

As another example, a user may register for a mobile wallet account from an online banking area of an issuing financial institution. The user may authenticate to the online banking area from a web browser running on an Internet-connected device such as a desktop computer, laptop, tablet, entertainment device, and so on. The user may also access the online banking area from a web browser of the intended mobile device. The user may be provided with an option to register for a mobile wallet account based on having an eligible payment account provided by the issuing financial institution. Again, the user may provide user preferences for the mobile wallet account during the online banking or mobile banking session. Once the user is registered, the user may register a mobile device for use of the mobile wallet account using a separate communication channel, which may include a separate device, location, and/or time. The registered mobile device enables the user to make payments from the user's source account(s) using the registered mobile wallet account.

As another example, a user may register for a mobile wallet account from an automated teller machine (ATM). For example, a user that currently uses a first brand of mobile wallet may initiate an authenticated session at an ATM (e.g., using an NFC connection between the user's mobile device and the ATM). The ATM may then recognize that the user is using the first brand of mobile wallet application (or is currently not using any mobile wallet), and is not currently registered to use a second brand of mobile wallet (e.g., wherein the second brand is the brand of mobile wallet offered by the financial institution that owns the ATM). The ATM may then display a message to user on the ATM screen indicating that the user can use the second brand of mobile wallet application instead of the first brand of mobile wallet application to make the current withdrawal, or to conduct subsequent ATM transactions (e.g., if the user wishes to finish the current transaction with the first brand of mobile wallet, given that the user has already started the authenticated session with the first brand of mobile wallet). The user may be provided with an option to "agree" and, if the user selects such option, the user may complete the wallet registration process via the ATM. Subsequently, after logging into mobile banking the user may be provided with a message (e.g., a selectable link) to register the user's mobile wallet account on the user's mobile device. Upon receiving a selection of the link, the user's mobile device is registered to use the mobile wallet account.

Referring to FIG. 1, a block diagram of a computer-implemented mobile wallet registration system 100 is shown, according to an example embodiment. The mobile wallet registration system 100 may be utilized to register a user and an associated mobile device for use of a mobile wallet. The mobile wallet registration system 100 includes a user mobile device 102, a financial institution computing system 104, a mobile wallet computing system 106, a registration terminal 108, and a token service provider 110. The various systems and devices may communicate through a network 112, which may include one or more of the Internet, cellular network, Wi-Fi, Wi-Max, a proprietary banking network, or any other type of wired or wireless network.

The user mobile device 102 is a mobile device associated with a user of one or more financial accounts (e.g., demand deposit accounts, credit or debit card accounts, brokerage accounts, etc.) provided by a source (e.g., issuing) financial institution. The user may include one or more individuals, business entities, government entities, and agents. The user mobile device 102 includes one or more circuits (e.g., one or more processors and non-transitory storage mediums housing one or more logics) that are structured to allow the user mobile device 102 to exchange data over the network 112, execute software applications, access websites, generate graphical user interfaces, and perform other operations described herein. The user mobile device 102 may include one or more of a smartphone or other cellular device, a wearable computing device (e.g., eyewear, a watch or bracelet, etc.), a tablet, a portable gaming device, a laptop, and other portable computing devices.

The user mobile device 102 includes a mobile wallet transaction circuit 114, a mobile device network circuit 116, a mobile device input/output (I/O) 118, and a mobile device client application 120. The mobile device network circuit 116 enables the user mobile device 102 to exchange data over the network 112, including with remote computing devices such as the financial institution computing system 104, the mobile wallet computing system 106, the registration terminal 108, and the token service provider 110. The mobile device I/O 118 includes hardware and associated logics that enable the user to exchange information with the user mobile device 102. An input aspect of the mobile device I/O 118 allows the user to provide information to the user mobile device 102, and can include, for example, a keyboard, a touchscreen, a microphone, a camera, a fingerprint scanner, any user input device engageable to the user mobile device 102 via USB, and so on. In turn, an output aspect of the mobile device I/O 118 allows the user to receive information from the user mobile device 102, and can include, for example, a digital display, a speaker, illuminating icons, LEDs, and so on.

The mobile device client application 120 facilitates communication between the user and a content provider associated with the user (e.g., financial institution computing system 104, mobile wallet computing system 106) via the user mobile device 102. The client application 120 may assemble information that is received from the content provider for the benefit of the user. The client application 120 includes an interface configured to receive and display mobile web pages (e.g., on the mobile device I/O 118) received from the content provider. The interface may be executed and maintained remotely by the content provider.

In one embodiment, the user is required to first download the client application 120 prior to its usage. For example, a provider (e.g., a software developer or publisher, the financial institution computing system 104, the mobile wallet computing system 106) can provide a software application for download (e.g., via the developer's website, via a digital marketplace, via an app store, via text message). Responsive to a user selection of an appropriate link, the software application can be transmitted to the user mobile device 102 and cause itself to be installed on the user mobile device 102. The client application 120 may be embodied on the user mobile device 102 as one or more processors and instructions stored in non-transitory memory that are executed by the one or more processors, along with hardware and associated logics depending on the operations performed by the client application 120.

In another embodiment, the client application 120 is a web-based application such that the user mobile device 102 may provide a thin client (web browser) interface to the client application 120, which may be executed and maintained remotely. In such an instance, the user may be required to log onto or access the web-based interface before usage of the client application 120. Further and in this regard, the client application 120 may be supported by a separate computing system comprising one or more servers, processors, network interface circuits, etc. that transmit the client application 120 for use to the user mobile device 102. In certain embodiments, the client application 120 includes an application programming interface (API) and/or a software development kit (SDK) that facilitates the integration of other applications with the client application 120. All such variations and combinations are intended to fall within the spirit and scope of the present disclosure.

In an example embodiment, the client application 120 includes a mobile banking application provided by the financial institution computing system 104. In this embodiment, the client application 120 may include an interface that enables the user to securely access and manage the user's financial accounts. For instance, the interface may display web pages indicative of current account balances, pending transactions, profile information, and any other information related to the user's financial account(s). In this embodiment, the client application 120 may also enable the user to perform various other tasks or functions that could otherwise be performed using the financial institution website or at a branch location. As will be appreciated, the level of functionality that resides on the user mobile device 102 as opposed to the financial institution computing system 104 may vary depending on the implementation.

The mobile wallet transaction circuit 114 is a circuit that facilitates operation of a mobile wallet on the user mobile device 102. The mobile wallet circuit 114 may be used by the user to conduct payment transactions using the user mobile device 102. The mobile wallet, including an associated mobile wallet account, may be provided by the mobile wallet computing system 106. The mobile wallet circuit 114 may facilitate communication between the user and the mobile wallet computing system 106. For instance, the mobile wallet circuit 114 may be used to access and manage the user's mobile wallet account(s). In various embodiments, the mobile wallet circuit 114 may receive and display screens from the mobile wallet computing system 106 on the mobile device I/O 118, including account information, transaction instructions, and so on. For instance, a screen may be used to request a wallet access code or other login credentials, instructions pertaining to a transaction about to be conducted, and so on. In some embodiments, the mobile wallet circuit 114 is implemented on the user mobile device 102 upon registering (e.g., associating, assigning) the user mobile device 102 with the user's mobile wallet account.

The mobile wallet circuit 114 may include software, such as a mobile application. Such software may be issued by or on behalf of the mobile wallet computing system 106 (or another system). In one embodiment, the mobile wallet computing system 106 provides the software application for download (e.g., via a website associated with the mobile wallet computing system 106, via an app store, etc.). Responsive to a user selection of an appropriate link or other action, the software application is transmitted to the user mobile device 102 and may cause itself to be installed on the user mobile device 102. Installation of the software application creates the mobile wallet circuit 114 on the user mobile device 102. Specifically, after installation, the thus-modified user mobile device 102 includes the mobile wallet circuit 114 (embodied as a processor and instructions stored in non-transitory memory that are executed by the processor). As will be appreciated, the level of functionality that resides on the user mobile device 102 as opposed to the mobile wallet computing system 106 may vary depending on the implementation.

In some arrangements, the mobile wallet circuit 114 is implemented on the user mobile device 102 based on an interaction with the mobile device client application 120. For example, the client application 120 may include a link or other option that is selectable by the user to register the user mobile device 102 for use of the user's mobile wallet account. Upon selection of the link by the user, the mobile wallet circuit 114 may then be implemented on the user mobile device 102, enabling use of the user's mobile wallet account using the user mobile device 102. The mobile wallet circuit 114 may also be included (e.g., combined) with the client application 120. For example, the mobile wallet circuit 114 may include a mobile wallet functionality (e.g., an API or interface) that is integrated (e.g., activated, implemented) as part of the mobile banking application (i.e., the client application 120) when the user mobile device 102 is registered for use of a mobile wallet account. In some embodiments, the mobile wallet circuit 114 and the client application 120 are implemented on the user mobile device 102 simultaneously. In such an embodiment, when the user logs into the mobile banking application, the user may be presented with an option to select a mobile wallet button. If the user has not previously used the mobile wallet on the mobile device 102, then such a selection "turns on" code previously stored on the mobile device 102 but not previously accessed by the user. The mobile wallet may then assume the preferences that were specified via another channel, e.g., via a banker at a branch location, via online banking, and so on, as previously described.

In one embodiment, client application 120 includes a mobile banking application provided by a source financial institution (i.e., the financial institution computing system 104). In this embodiment, the financial institution computing system 104 and the mobile wallet computing system 106 are operated by the same source financial institution (i.e., the source financial institution is the mobile wallet provider). When the user authenticates to the mobile banking application, the user is recognized by the source financial institution as a registered user of a mobile wallet account provided by the source financial institution. The user is then provided (i.e., via the client application 120) with a selectable option (e.g., link, button, drop-down, etc.) to register the user mobile device 102 for use of the identified mobile wallet account. Upon selection of the option (via the client application 120), the mobile wallet circuit 114 is implemented on the user mobile device 102, enabling use of the mobile wallet account by the user mobile device 102. Again, assuming mobile wallet preferences were specified via another channel (via a banker at a branch location, via online banking, and so on, as previously described), then there is no need for the user to re-specify those preferences. For example, if the user specified preferences via a banker using a computer at a branch location, or using a laptop computer during an online banking session, then there is no need for the user to re-specify those preferences via the user interface provided by via the mobile device 102. In many situations, a user may find it easier to specify such preferences via a banker or via a user interface provided on a laptop computer than via a user interface provided by the mobile device 102.

The mobile wallet circuit 114 may access any information provided by the user when registering for a mobile wallet account. For example, the mobile wallet circuit 114 may access user identifying information, a wallet access code, payment account information, user preferences (e.g., default payment account), as well as other information such as terms and conditions associated with the mobile wallet account. The mobile wallet circuit 114 may also store payment tokens associated with the user's source financial accounts. The payment tokens may be generated and/or provided to the user mobile device 102 by the mobile wallet computing system 106 and/or the token service provider 110 upon registration of the user mobile device 102. The mobile wallet circuit 114 is configured to transmit the payment tokens to merchants and other users (e.g., via the mobile device I/O 118) as part of a transaction.

The financial institution computing system 104 is a computing system at a financial institution that provides and maintains one or more financial accounts (e.g., demand deposit account, credit or debit card account, brokerage account, etc.) on behalf of the user. The one or more financial accounts may be used as a source payment account for a mobile wallet account held by the user. In the context of the present disclosure, the financial institution can include commercial or private banks, credit unions, investment brokerages, mobile wallet providers, and so on, but can also include any commercial entity capable of maintaining payment accounts on behalf of a user, including retailers, vendors, service providers, and the like. In some arrangements, the financial institution is also a mobile wallet provider configured to manage mobile wallet accounts on behalf of its customers (i.e., users), including authenticating mobile wallet transactions involving debits from the users' payment accounts. For example, the financial institution may also operate the mobile wallet computing system 106 in various embodiments.

The financial institution computing system 104 includes an account management circuit 122, an accounts database 124, and a financial institution network circuit 126 that enables the financial institution computing system 104 to exchange data over the network 112. The accounts database 124 allows the financial institution computing system 104 to retrievably store user information relating to the various operations discussed herein, and may include non-transient data storage mediums (e.g., local disc or flash-based hard drives, local network servers, and the like) or remote data storage facilities (e.g., cloud servers). The accounts database 124 may include personal information (e.g., names, addresses, phone numbers, and so on), authentication information (e.g., username/password combinations, device authentication tokens, security question answers, unique customer identifiers, biometric data, etc.), and financial information (e.g., token information, account numbers, account balances, available credit, credit history, transaction histories, and so on) relating to the various users and associated financial accounts.

The account management circuit 122 is structured to manage the financial accounts of various users, including maintaining and handling transaction processing for the user's one or more financial accounts. In some embodiments, the mobile device client application 120, including any associated interfaces, displays, and associated content, is provided and/or operated by the account management circuit 122 of the financial institution computing system 104. In these embodiments, the client application 120 may be executed and maintained remotely by the financial institution computing system 104. For instance, the account management circuit 122 may provide a mobile banking application for use on the user mobile device 102. As will be appreciated, the level of functionality that resides on the user mobile device 102 as opposed to the financial institution computing system 104 may vary depending on the implementation.

The mobile wallet computing system 106 is operated by a mobile wallet provider capable of maintaining and handling transaction processing for various mobile wallet accounts. In some arrangements, the mobile wallet computing system 106 is provided by a financial institution, e.g., the same financial institution that provides the financial institution computing system 104 (e.g., a financial institution that offers a mobile wallet application as part of its range of product offerings provided to customers), or another financial institution. In other arrangements, the mobile wallet provider may be a third party provider (e.g., Apple Pay, Samsung Pay, etc.) that manages the various mobile wallet accounts on behalf of the users. In such arrangements, the mobile wallet accounts are funded by source payment accounts from a separate financial institution (e.g., financial institution computing system 104). In these arrangements, the mobile wallet provider may be a financial institution, but the mobile wallet provider is separate and distinct from the source financial institution.

In arrangements where the mobile wallet provider is the source (e.g., issuing) financial institution, each of the operations described herein and relating to one of the financial institution computing system 104 and the mobile wallet computing system 106 may be performed by the same financial institution. In such arrangements, the financial institution computing system 104 and the mobile wallet computing system 106 may be operated as a single computing system, or as two or more separate computing systems (as shown in FIG. 1) performing the associated functions described herein. As will be appreciated, the level of functionality that resides on the financial institution computing system 104 as opposed to the mobile wallet computing system 106 in these arrangements may vary depending on the implementation.

The mobile wallet computing system 106 is configured to register both a user and an associated mobile device for use of a mobile wallet account. In some arrangements, the user and the mobile device are registered separately (e.g., using different communication channels, using different devices, at different times, etc.). For example, the user may be registered for a mobile wallet account based on information received from the user via the registration terminal 108. For example, the registration terminal 108 may be operated by a banker when the user opens an account, and the information received from the user may be entered by the banker into the registration terminal. As another example, the registration terminal 108 may be a computer that the user uses to access online banking for a previously-existing account. As another example, the registration terminal 108 may be an ATM that the user uses to access account information for a previously-existing account while performing other tasks (e.g., obtaining cash). The information received from the user may include a selection of the payment accounts (e.g., source payment accounts) to be provisioned for the mobile wallet account, selection of a default payment account, acceptance of terms and conditions associated with the mobile wallet account, and so on. As is described in further detail below, the registration terminal 108 may include any device or interface configured to facilitate communication between the user and the mobile wallet computing system 106. In an example embodiment, the registration terminal 108 is separate and distinct from the user mobile device (e.g., user mobile device 102). The mobile wallet computing system 106 is configured to register the user as a mobile wallet user and create a mobile wallet account based on the information provided via the registration terminal 108.

The mobile wallet computing system 106 is configured to separately register a mobile device for use of the registered user's mobile wallet account. The mobile wallet computing system 106 is configured to exchange information with the mobile device (i.e., the user mobile device 102) as part of device registration. Such information may be provided by the user, such as a wallet access code and/or other authentication information. Such information may also be provided by the device, including a device address, device identifier, etc. In some embodiments, the mobile wallet computing system 106 identifies the user's mobile wallet account based on some identifying information provided to the user mobile device 102. For instance, the mobile wallet computing system 106 may determine that the user of the user mobile device 102 is a registered user of a mobile wallet account, then send a message to the user mobile device 102 offering to register the device 102 for use of the mobile wallet account. For example, if the user registers for a mobile wallet account with the assistance of a banker when the user opens an account, among the information collected about the user when opening the account may be a mobile telephone number for the device 102. When the mobile wallet computing system 106 determines that the registration process has been completed, the mobile wallet computing system 106 may send a text message to the user at the provided telephone number offering to register the device 102 for use of the mobile wallet account. As another example, when a user registers via online banking, the telephone number for the device 102 may have been previously collected and may already be stored with the user's account information, and the mobile wallet computing system 106 may send a text message to the previously-stored telephone number offering to register the device 102 for use of the mobile wallet account. Likewise, if the user registers via an ATM, a text message may be sent in the manner.

When the user mobile device 102 is registered (i.e., the device 102 is assigned to the mobile wallet account), the mobile wallet computing system 106 may facilitate provisioning of one or more of the user's payment accounts to the user mobile device 102. Provisioning the payment account(s) may include tokenizing the account information (e.g., account numbers) for the one or more payment accounts, generating one or more payment tokens that may be used to make payments from the user mobile device 102. The payment tokens may be stored at the user mobile device, the mobile wallet computing system 106, and/or the token service provider 110. The provisioned payment account(s) may have been selected by the user. Once the account(s) are provisioned, the device 102 is enabled for use to transact with merchants and other users using the mobile wallet account.

The mobile wallet computing system 106 is also configured to apply (e.g., transfer) any preferences and settings stored at the mobile wallet account to the registered device. For example, the mobile wallet computing system 106 may be configured to automatically apply to the registered user mobile device 102 any information that was provided or selected by the user during user registration (e.g., user-selected default source accounts and other user preferences). In some arrangements, the mobile wallet computing system 106 may be provided as part of a cloud-based, or Internet-based, computing system that is accessible from an Internet-connected device or system. In these embodiments, the user profile may be updated by the user from an Internet-connected device, including the registration terminal 108 and the user mobile device 102. Any changes made to the cloud-based user profile may be implemented on any associated mobile devices. For example, in an example embodiment, the mobile wallet computing system 106 updates the mobile wallet account or the user mobile device 102 accordingly when the other is modified. Further, the mobile wallet computing system 106 may be configured to apply the preferences and settings stored with the mobile wallet account to any additional mobile devices registered with the mobile wallet account. For example, if a user makes a change to a default source account setting using one mobile device, the changed setting may also be applied to other devices when the user uses the other devices to access the same mobile wallet account.

Further, by virtue of storing the user profile on the cloud, the user may easily switch between mobile devices (e.g., when the user's mobile device is lost and the user replaces the lost mobile device with another mobile device) without having to create another user-profile. Upon switching devices, the user may simply log into the user's mobile wallet account and access the user-profile. Storing the user-profile on the cloud may be particularly helpful when the user is switching between devices that employ different wallet technologies (e.g., a secure element technology or a host card emulation technology), and that store information in different ways. By storing the user-profile on the cloud, the user may access the user-profile regardless of which wallet technology the user's mobile device is based upon.

Additionally, by storing the user-profile in the cloud, the user may add multiple cards (e.g., credit cards) on the cloud. The multiple cards may be linked to one or more of the source payment accounts of the user. On the cloud, each of the multiple cards may be tokenized, such that those cards are immediately available to the user for making payments (e.g., by logging into the mobile wallet account) if the user switches mobile devices. Thus, the present disclosure provides a multi-card provisioning mechanism, such that a user's mobile wallet relationship with one mobile device may be replicated on another mobile device without the user having to manually add any additional cards to the mobile wallet account after switching.

The mobile wallet computing system 106 includes a mobile wallet circuit 128, a user registration circuit 130, a mobile wallet network circuit 132, and a user accounts database 134. The mobile wallet network circuit 132 enables the mobile wallet computing system 106 to exchange data over the network 112. For example, the mobile wallet computing system 106 may be configured to exchange data with the registration terminal 108 and the user mobile device 102 to register the user and the user mobile device 102, respectively, for use of a mobile wallet account.

The user accounts database 134 stores information regarding mobile wallet accounts held by various users, including for a mobile wallet account held by the user of the user mobile device 102. For instance, the user accounts database 134 may store various information related to the user and/or an associated mobile device (e.g., user mobile device 102) upon registration of one or both. The stored mobile wallet account information may include authentication information (e.g., username/password combinations, device authentication tokens, security question answers, etc.), payment card information, transaction history, account holder identifying information, registered device information, and any other information that may be encountered in the operation of a mobile wallet account or otherwise referenced herein. Such information may include user preferences and other information comprising a user profile. In some arrangements, for example, the accounts database 134 also includes a token vault (e.g., a token management system) that is maintained at the mobile wallet computing system 106. The token vault may be utilized to provision and manage payment tokens on behalf of the mobile wallet users associated with the mobile wallet computing system 106.

The mobile wallet circuit 128 enables or otherwise supplements the functionality of the mobile wallet on the user mobile device 102. In some embodiments, the mobile wallet circuit 114, including any associated user interfaces, displays, and associated content, is provided and/or operated by the mobile wallet circuit 128. For instance, the mobile wallet circuit 114 may be downloaded to the user mobile device 102 based on content provided by the mobile wallet circuit 128. The mobile wallet computing system 106 may provide the mobile wallet circuit 114 to the user mobile device 102 when the user mobile device 102 is registered for use of a mobile wallet account. The mobile wallet computing system 106 may also provide the mobile wallet circuit 114 as part of a larger application that is provided on the device 102, such as a mobile banking application.

The user registration circuit 130 enables or otherwise supplements the functionality of the registration terminal 108. For example, the user registration circuit 130 may provide and/or operate a user interface (e.g., user registration interface 142) at the registration terminal 108, including providing any interfaces, displays and associated content to the registration terminal 108. In some arrangements, the user registration interface 142 may be at least partially downloaded to the registration terminal 108 based on content provided by the user registration circuit 130.

The user registration circuit 130 is also configured to exchange information with the user via the registration terminal 108, including to facilitate registration of the user for a mobile wallet account. The user registration circuit 130 may be configured to identify information that is required to register the user, then request the information from the user using the registration terminal 108. For example, the user registration circuit 130 may be configured to retrieve any user information that is found in an accounts database (e.g., accounts database 124, user accounts database 134), then identify any required information that is not already known to the mobile wallet computing system 106 based on the retrieved information. The user registration circuit 130 may also identify any payment accounts that are eligible for provisioning to the mobile wallet account, and provide this information to the user via the registration terminal 108. For example, where the mobile wallet computing system 106 is operated by an issuing financial institution, the user registration circuit 130 may identify any eligible payment accounts provided by the issuing financial institution.

The user registration circuit 130 may be configured to prompt the user (via the registration terminal 108) to register for a mobile wallet account based on a trigger. In some arrangements, the user registration circuit 130 prompts the user to register for a mobile wallet account when an eligible payment account of the user is identified. For example, the registration terminal 108 may be an automated teller machine (ATM) or other terminal requiring the user to provide authentication credentials to access the terminal 108. The user registration circuit 130 may identify the user based on the authentication credentials, including identifying an eligible payment account associated with the user. The user registration circuit 130 may then prompt the user to register for a mobile wallet account at the registration terminal 108. As another example, a user that has registered for a mobile wallet account may be sent a message (e.g., a text message) with a link that may be selected by the user to activate the new mobile wallet account. User selection of the link may uniquely identify the user (i.e., the link is unique to the user).

In some arrangements, the user registration circuit 130 prompts the user to register for a mobile wallet account when the user opens a new financial account. For example, the mobile wallet provider may be an issuing financial institution and the registration terminal 108 a terminal at a branch location of the issuing financial institution. When a user opens a financial account with the issuing financial institution, such as a payment account eligible for use with a mobile wallet account, the user registration circuit 130 may prompt the user to register for a mobile wallet account provided by the issuing financial institution. The user may be prompted via the registration terminal 108 at the branch location upon opening the financial account.

The registration terminal 108 is a computing system that enables a user to register for use of a mobile wallet (e.g., a mobile wallet account). The registration terminal 108 is configured to facilitate communication between the user and the mobile wallet computing system 106 to register the user. For example, the registration terminal 108 is configured to exchange information with the user either directly or via an operator of the registration terminal 108. The registration terminal 108 is also configured to exchange information with the mobile wallet computing system 106 over the network 112.

The registration terminal 108 may be associated with (e.g., owned or operated by) the mobile wallet provider. For example, where the mobile wallet computing system 106 is operated by a financial institution, the registration terminal 108 may include an automated teller machine (ATM) associated with the financial institution, a user interface (e.g., teller device) provided at a branch location of the financial institution, and so on. The registration terminal 108 may also be associated with the user. For example, the registration terminal 108 may include a smartphone, tablet, wearable computing device, laptop computer, desktop computer, virtual desktop, a digital media player (e.g., Apple TV, Roku, etc.), or other device configured to communicate remotely with the mobile wallet computing system 106 (e.g., via an online banking website or other website). In still other embodiments, the registration terminal 108 is operated by a third party (e.g., a merchant), but configured to facilitate communication between the user and the mobile wallet computing system 106.

Although both may be computing devices operated by the user, the registration terminal 108 may be separate and physically distinct from the user mobile device 102 (e.g., each of the registration terminal 108 and the user mobile device 102 include distinct respective housings, and may be carried by a user independently of each other). As such, for example, the registration terminal 108 and the user mobile device 102 may each be a mobile device operated by the user in some arrangements, but be separate and physically distinct from each other. In other arrangements, the registration terminal 108 and the user mobile device 102 may include the same device, but with one or more functions attributed to the registration terminal 108 and the user mobile device 102 being performed using separate and distinct communication channels. For example, the registration terminal 108 and the user mobile device 102 may both be a mobile device of the user, with the functions of the registration terminal 108 (e.g., registration of the user) being performed using a web browser on the mobile device, and the functions of the user mobile device 102 (e.g., registration of the user mobile device 102) being performed using a mobile wallet or mobile banking application provided by the mobile wallet provider. In each of these arrangements, the user and the associated device are registered for use of a mobile wallet using separate and distinct channels of communication.

As shown in FIG. 1, the registration terminal 108 includes a data exchange circuit 136, a terminal network interface 138, a terminal input/output (I/O) 140, and a user registration interface 142. The terminal network interface 138 enables the registration terminal 108 to exchange data over the network 112. For example, registration terminal 108 may exchange information with the mobile wallet computing system 106 in order to register a user for a mobile wallet account.

The data exchange circuit 136 is configured to exchange data among the terminal I/O and the mobile wallet computing system 106 to perform the operations attributed to the registration terminal 108, including to facilitate registration of a mobile wallet user. The data exchange circuit 136 is configured to receive information from the user (e.g., via an operator) that is required to register the user for a mobile wallet account. The information is received from the terminal I/O 140. In various embodiments, such information may include one or more of user authentication information (e.g., credentials associated with the user, the source financial institution, the mobile wallet provider, etc.), a wallet access code (e.g., selected by the user), payment account information (e.g., identification of payment accounts to be provisioned), user preferences (e.g., default payment account, transaction limits, etc.), and acceptance of terms and conditions associated with the mobile wallet account. The data exchange circuit 136 is configured to facilitate registration of the user by causing the user registration information to be sent to the mobile wallet computing system 106. The data exchange circuit 136 is also configured to receive information from the mobile wallet computing system 106, and cause the information to be displayed at the registration terminal 108 (e.g., to the user or another operator) using the terminal I/O 140.

The terminal I/O 140 includes one or more devices and associated circuits configured to facilitate communication between the user (or an operator of the registration terminal 108) and the mobile wallet computing system 106. The terminal I/O 140 is configured to receive information from the user, or another operator of the registration terminal 108 (e.g., a bank teller). For example, an input aspect of the terminal I/O 140 can include a magstripe reader, a keyboard, a touchscreen, a microphone, a camera, a fingerprint scanner, any user input device engageable to the registration terminal 108 via a USB, serial cable, and so on. In turn, the terminal I/O 140 is configured to display information (e.g., from the mobile wallet computing system 106) to the user or other operator. For example, an output aspect of the terminal I/O 140 can include a digital display, a speaker, illuminating icons, LEDs, a paper (e.g., receipts) dispenser, and so on. In addition, in some embodiments the input aspect and the output aspect of the terminal I/O 140 include a wireless data transmission service configured to remotely and securely exchange data.

The user registration interface 142 facilitates communication between the user and the mobile wallet computing system 106 via the registration terminal 108. The user registration interface 142 may be utilized by the user (or another operator) to register the user for use of a mobile wallet account. The user registration interface 142 includes one or more interfaces configured to display information received from the mobile wallet computing system 106, which are shown by way of example in FIGS. 3-6. The user registration interface 142 may assemble the information received from the mobile wallet computing system 106 on behalf of the user. The user registration interface 142 may be executed and maintained remotely by the mobile wallet computing system 106. In particular, the user registration interface 142, including any associated interfaces, displays, and associated content, may be provided and/or operated by the user registration circuit 130. As will be appreciated, the level of functionality that resides on the registration terminal 108 as opposed to the mobile wallet computing system 106 may vary depending on the implementation.

In some arrangements, the user registration interface 142 is embodied on the registration terminal 108. For example, the user registration interface 142 may include one or more processors and instructions stored in non-transitory memory that are executed by the one or more processors, along with hardware and associated logics depending on the operations performed by the user registration interface 142.

In some arrangements, the user registration interface 142 includes a web-based interface that is displayed via a thin-client application (e.g., a web browser) of the registration terminal 108. The web-based interface may be executed and maintained remotely by the mobile wallet computing system 106. The web-based interface may facilitate the exchange of information, data, values, and the like between the registration terminal 108 and the mobile wallet computing system 106 in order to register the user for a mobile wallet account. In this regard, the user may be required to provide authentication credentials to access the registration terminal 108 (e.g., communicate with the mobile wallet computing system 106). In certain embodiments, the user registration interface 142 includes an application programming interface (API) and/or a software development kit (SDK) that facilitates the integration of other applications with the user registration interface 142. All such variations and combinations are intended to fall within the spirit and scope of the present disclosure.

In an example embodiment, the user registration interface 142 includes a web-based interface (e.g., a webpage) that may be accessed by the user using a web browser. In this embodiment, the registration terminal 108 may include any user device capable of accessing the web-based interface, including a desktop or laptop computer, tablet or other mobile device, entertainment device, wearable device, and so on. The web-based interface may be accessed through a website associated with the mobile wallet computing system 106. The web-based interface may also be provided on a device operated by or otherwise associated with the mobile wallet computing system 106, including an ATM or a terminal at a store location. In some embodiments, the web-based interface may be accessed using a web browser on the user mobile device 102. Once the user is registered, the user may register the user mobile device 102 using a separate communication channel, such as a client application provided by the mobile wallet computing system 106 and associated with mobile banking and/or mobile wallet circuitry.

The token service provider 110 includes a computing system configured to provision payment credentials (e.g., payment tokens) on behalf of a mobile wallet user. The token service provider 110 may be operated by a credit card network or other type of payment system, an acquiring or issuing financial institution (e.g., financial institution computing system 104), a merchant, a mobile wallet provider (e.g., mobile wallet computing system 106), and/or another provider. The token service provider 110 is configured to communicate remotely with the other systems and devices of system 100 via the network 112.

The token service provider 110 may be configured to facilitate various services associated with payment tokens, including provisioning (e.g., generating) new tokens, authorizing a token for use in a financial transaction, storing payment account tokens (e.g., in a token database), and managing the life cycles of the payment account tokens. The token service provider 110 may be configured to provision payment tokens in response to a request received from the mobile wallet computing system 106. For example, the mobile wallet computing system 106 may request that the token service provider 110 provision payment tokens for those payment accounts selected when the user is registered. As another example, the mobile wallet computing system 106 may request one or more payment tokens be provisioned when the user mobile device 102 is registered. The payment tokens may be provisioned based on information related to the associated payment account using any known method.

Figure 2:
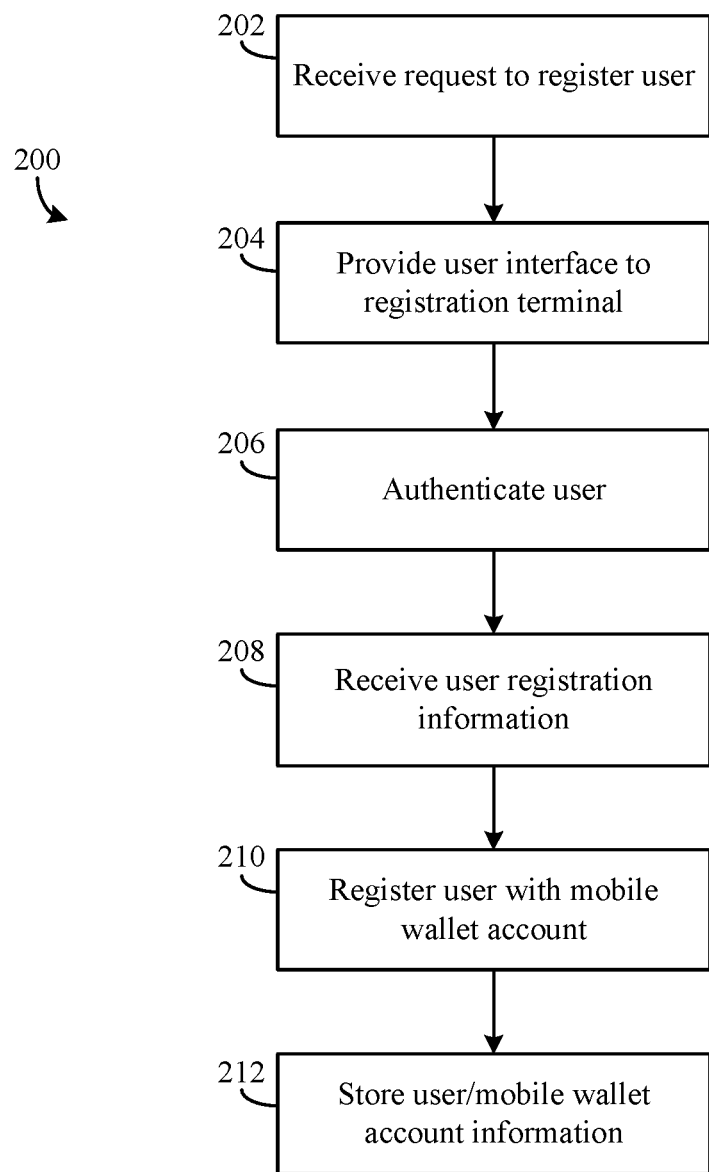
FIG. 2 is a schematic flow diagram of a process for registering a user for a mobile wallet account using the system of FIG. 1, according to an example embodiment.

Referring now to FIG. 2, process 200 is shown, according to an example embodiment. The process 200 may be used by a mobile wallet provider to register a user for a mobile wallet account. The mobile wallet provider may be an issuing financial institution or a third party mobile wallet provider. The process 200 is described herein as being performed using the mobile wallet computing system 106, which is operated by the mobile wallet provider. However, in various embodiments, the steps of process 200 may be performed using any of the systems and devices shown in the mobile wallet registration system 100, alone or in any combination. Further, each of the systems and devices of system 100 may be at least partially operated by the mobile wallet provider. In embodiments in which the mobile wallet provider is an issuing financial institution, the mobile wallet computing system 106 may refer to a computing system that performs the operations of both the mobile wallet computing system 106 and the financial institution computing system 104.

At 202, the mobile wallet computing system 106 receives a request to register a user for a mobile wallet account. The request may be received from the user or an operator of the registration terminal 108 (e.g., a bank teller, a cashier, etc.). The request may be received via the registration terminal 108. The request may include selection of a link or other selectable option at the registration terminal 108. As an example, a selectable option (e.g., link, button, etc.) may be provided on an ATM interface. As another example, a selectable option may be provided on a webpage associated with the mobile wallet computing system 106, such as an online banking area of an issuing financial institution.

At 204, the user registration interface 142 is provided to the registration terminal 108 by the mobile wallet computing system 106. The interface 142 may include various interfaces or displays which are intended to enable a user of the system 100 to register for a mobile wallet account (i.e., to register as a mobile wallet user). Examples of such interfaces are shown in FIGS. 3-6. In some arrangements, the user registration interface 142 is provided (e.g., activated) at the registration terminal 108 in response to a trigger. For example, the interface 142 may be provided in response to the request received from the user. As another example, the interface 142 may be activated based on account activity of the user, including based on the user opening a payment account that is eligible for use in a mobile wallet. Other account activity may include use of an eligible payment account at the registration terminal 108, use of an online banking tool (e.g., a mobile banking application) associated with the mobile wallet computing system 106, and issuance of a new payment card (e.g., credit card, debit card, etc.) by the issuing financial institution.

At 206, the mobile wallet computing system 106 authenticates the user based on information received via the registration terminal 108. The user may be authenticated based on any information associated with the user and known to the mobile wallet computing system 106, which may include alphanumeric usernames and passwords, personal identification numbers, biometric information, signatures, and/or other information. In some arrangements (e.g., where the mobile wallet provider is the issuing financial institution), the authentication information includes credentials associated with the user's issuing financial institution. Once the user is authenticated, the mobile wallet computing system 106 may retrieve any information known to the mobile wallet computing system 106 and associated with the credentials. For example, the mobile wallet computing system 106 may retrieve account information for eligible payment accounts, user preferences, and other information for use in registering the user with a mobile wallet account.

As will be appreciated, the manner in which the user is authenticated during registration may vary depending on the manner in which the user registers for the mobile wallet account. For example, if the user registers at a branch location with the assistance of a banker after opening a new account, the user may be authenticated by providing a photo ID (e.g., valid state driver's license, passport, etc.) as part of the new account opening process. As another example, if the user registers at an ATM, authentication may be performed based on possession of an ATM card, successful entry of a PIN, and/or other measures.

In the example of FIGS. 3-6, the user registers via a secure website accessed with a mobile device. For example, the user may be opening a new account or conducting other business at a branch location. The banker may then alert the user to the opportunity to register for a mobile wallet account, and may send (e.g., via text, email, etc.) a link to the secure website to the mobile device. The banker may then guide the user through the mobile wallet account registration process. Although one example is shown in FIGS. 3-6, as previously indicated, the user may also register for a mobile wallet account through other channels, and may set preferences and provide other information in the same manner as shown in FIGS. 3-6. In some embodiments, the user may register via a mobile application, e.g., a mobile banking application which is already installed on the device 102. The mobile banking application may include a mobile wallet application which may be stored on the device, but which may not be accessible by the user until the user registers for a mobile wallet account. Once the user registers for the mobile wallet account, the mobile wallet application within the mobile banking application may be activated.

Figure 3:
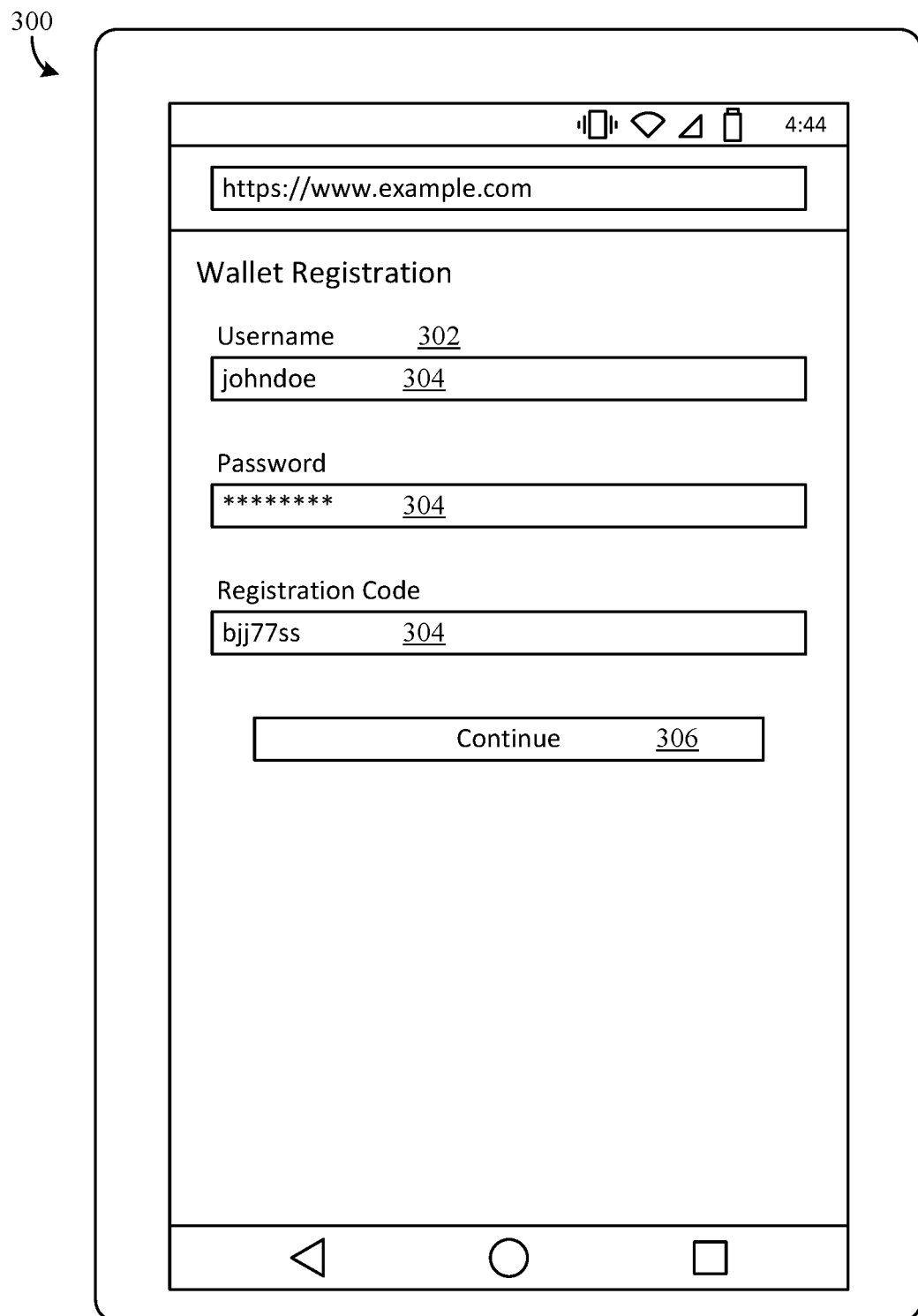
FIG. 3 is an interface that may be presented on a display of the registration terminal of FIG. 1 to enable a user to provide authentication information, according to an example embodiment.

Returning again to the example of FIG. 3, as shown in FIG. 3, the user may be provided with an interface 300 (e.g., user interface, screen, display, etc.). The interface 300 includes an authentication area 302. The authentication area 302 includes fields 304 for entering authentication credentials (e.g., online banking credentials). In this embodiment, the fields 304 include a username and password. In some embodiments (e.g., where registration is occurring at a branch location with the guidance of a banker, and the user has no previous banking relationship with the bank), the user may enter information into fields 304 to create a new username and password. In other embodiments (e.g., where the user has a pre-existing relationship with the bank), the user may be required to provide the user's pre-existing username and password associated with the issuing financial institution (e.g., the user's online banking credentials). Fields 304 also include a "registration code" in this embodiment. The registration code may be a code previously provided to the user by the mobile wallet computing system 106, e.g., via verbal communication from a banker, via text message, or in another manner. The registration code may be provided to the user based on the user's interest in a mobile wallet account, or based on the user having (e.g., opening) a payment account that is eligible for use in a mobile wallet. Once the credentials are entered, the operator of the registration terminal 108 may interact with button 306 to transmit the credentials to the mobile wallet computing system 106.

Referring again to FIG. 2, at 208 the mobile wallet computing system 106 receives user registration information via the registration terminal 108. The user registration information is provided by the user. The user registration information may include any information required to register the user for a mobile wallet account, including any user preferences to be associated with the mobile wallet account. For example, the user registration information may include a selection of one or more payment accounts (e.g., credit cards, debit cards, etc.) to be provisioned to the mobile wallet account. The one or more payment accounts may be selected from a list of eligible payment accounts. The list may be provided by the mobile wallet computing system 106. The eligible payment accounts may be determined based on account information for the user retrieved from an issuing financial institution of the user (e.g., as opposed to having the account information being provided by the user, e.g., by taking a picture of a credit card or debit card and transmitting the picture to the mobile wallet computing system). Provisioning and activation of a payment account in a mobile wallet, and subsequent utilization of the thus-provisioned and activated payment account in a payment transaction, is discussed in greater detail in U.S. Ser. No. 14/553,756, filed Nov. 25, 2014, entitled "Mobile Wallet Account Balance Systems and Methods," hereby incorporated by reference in its entirety in this regard. The user registration information may also include acceptance of various terms and conditions associated with the mobile wallet account.

Figure 4:
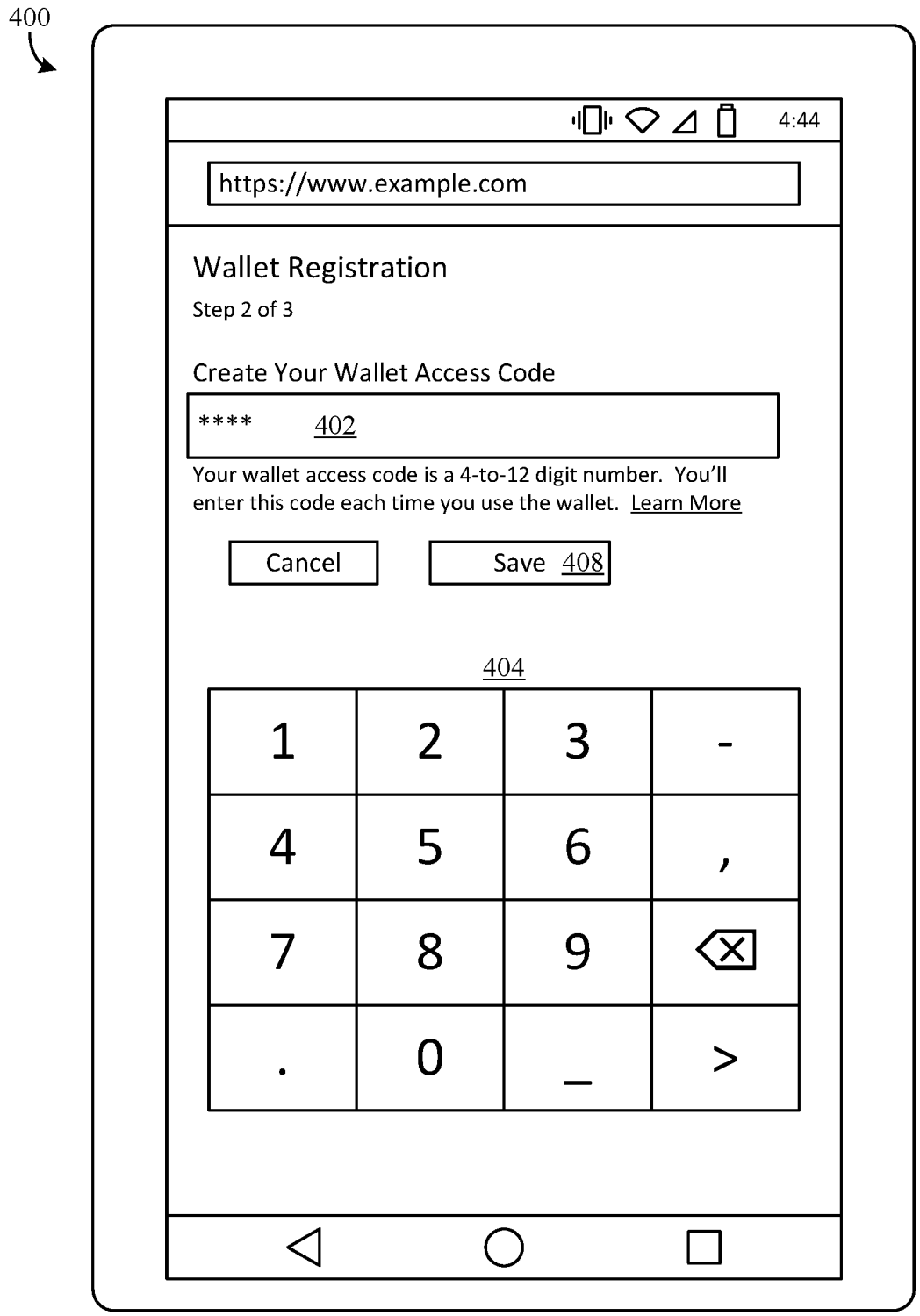
FIG. 4 is an interface that may be presented on a display of the registration terminal of FIG. 1 to enable a user to select an access code for a mobile wallet account, according to an example embodiment.

The user registration information may also include a code for accessing the mobile wallet account (i.e., a "wallet access code") akin to a PIN for using an ATM card. The mobile wallet computing system 106 may prompt the user to create a wallet access code when a mobile wallet account is requested. For example, FIG. 4 shows an interface 400 that may be presented to the user to prompt creation of a wallet access code. The interface 400 includes a field 402 for entering the wallet access code. The wallet access code may be selected (i.e., the field 402 may be populated) by interacting with number pad 404. In this embodiment, the wallet access code is restricted to a 4-to-12 digit number, but in other embodiments the wallet access code may be any other known type of authentication, including an alphanumeric password, biometric information, voice recognition, and so on. Once the wallet access code is entered, the user may send the code to the mobile wallet computing system 106 by interacting with button 408, which may "save" or store the code with the user's mobile wallet account.

Figure 5:
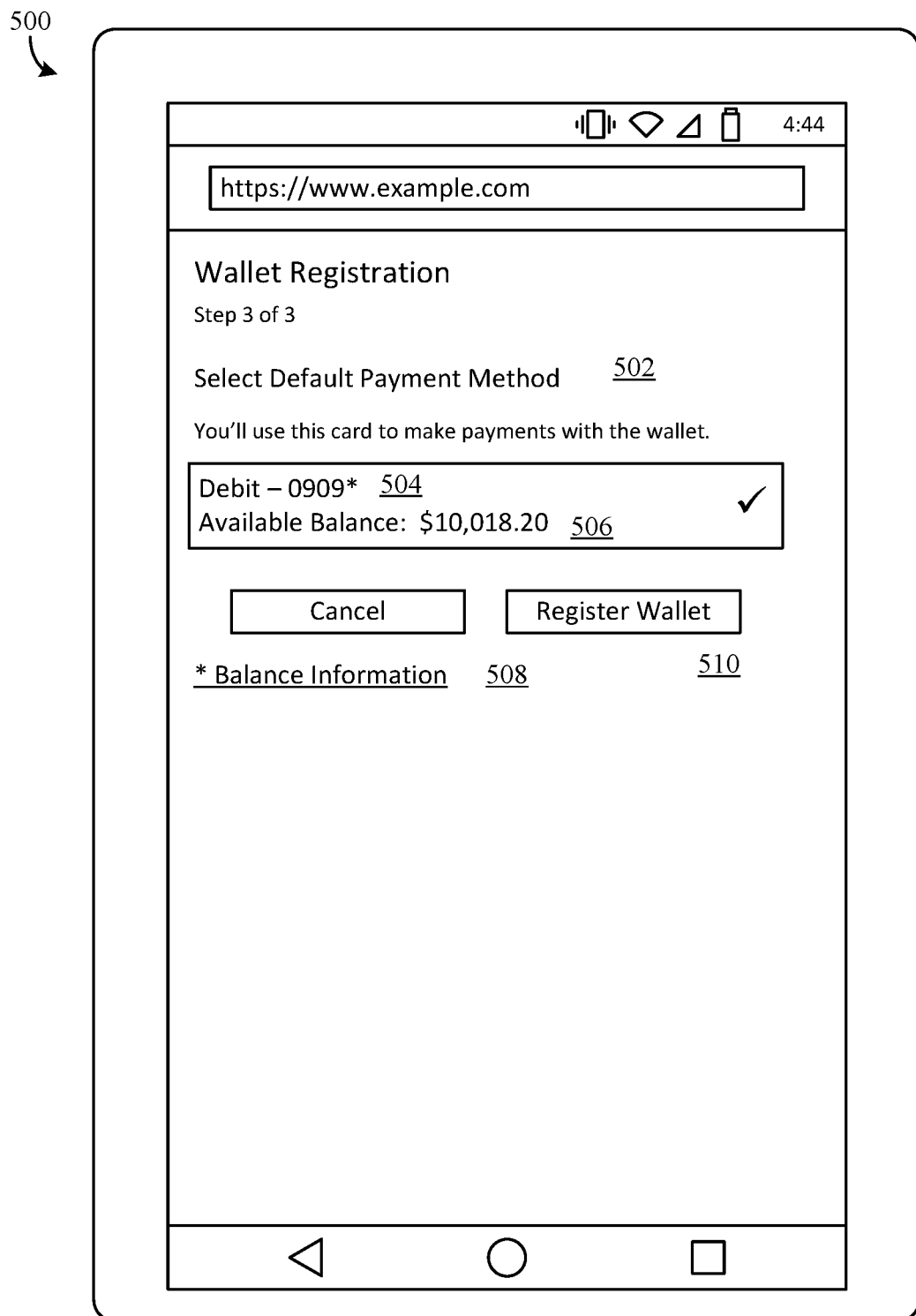
FIG. 5 is an interface that may be presented on a display of the registration terminal of FIG. 1 to enable a user to select a default payment method for a mobile wallet account, according to an example embodiment.

The user registration information may also include selection of a default payment account for use with the mobile wallet account. For example, FIG. 5 shows an interface 500 that may be presented to the user to prompt the user to select a default payment method. The interface 500 includes a payment account area 502, which may include a listing of mobile wallet-eligible payment accounts associated with the user. To select a payment account, the user may interact with dropdown menu 504. Once the dropdown menu 504 is selected, the default payment account may be selected from a listing of payment accounts to be provisioned to the mobile wallet account. As shown in FIG. 5, the dropdown menu 504 may include information related to the payment account, including an account number (e.g., card number) and available balance. The mobile wallet computing system 106 may automatically select the payment account having the highest balance, the payment account that is used most often, etc., with the user having the option to change the selection. In the example embodiment of FIG. 5, the mobile wallet computing system 106 is operated by an issuing financial institution, and a debit card provided by the issuing financial institution is selected as the default payment method.

In some embodiments, the user may be given the option to select multiple potential default accounts, wherein the account that serves as the actual default account in a particular transaction is context-dependent. For example, the user may wish to use a mobile wallet account to make payments at a point of sale as well as to withdraw funds from an ATM. The user may therefore be provided with an option to make a first payment account (e.g., a credit card account) the default account for purposes of point of sale transactions, and a second payment account (e.g., a debit card account) the default account for purposes of ATM transactions. Accordingly, subsequently, when the user is at a point of sale, the mobile wallet transaction circuit 114 may detect that the transaction is a point of sale transaction and may surface the credit card account as the default account for that transaction. Likewise, when the user is at an ATM, the mobile wallet transaction circuit 114 may detect that the transaction is an ATM transaction and may surface the debit card account as the default account for that transaction. The mobile wallet transaction circuit 114 may determine that the transaction is an ATM transaction based on information received from the ATM. For example, the ATM may be owned/operated by the same bank that provides the mobile wallet computing system 106. After an NFC tap occurs between the mobile device 102 and the ATM, the mobile wallet transaction circuit 114 may determine that the transaction to be conducted is an ATM transaction (e.g., based on messaging received from the ATM). In situations where no such messaging from an ATM is received, or alternatively where messaging is received from the point of sale device, the mobile wallet transaction circuit 114 may determine that the transaction to be conducted is point of sale transaction.

Also shown in FIG. 5 is a field 506 that presents account balance information for the payment account. Presentation of balance information is also discussed in greater detail in the aforementioned application U.S. Ser. No. 14/553,756, filed Nov. 25, 2014, entitled "Mobile Wallet Account Balance Systems and Methods," hereby incorporated for this purpose as well. Account balance information may be presented to the user at various times. For example, as shown in FIG. 5, account balance information may be displayed during selection of a default account. For example, if multiple payment accounts are provisioned to the mobile wallet, the account balance information may be displayed for each of the accounts from which the user is to select from when selecting the default account. As another example, the account balance information may be provided to the user before and/or after a payment transaction is performed. In some embodiments, the mobile wallet transaction circuit 114 automatically retrieves current account balance information from the mobile wallet computing system 106 when the account balance information is to be displayed. In other embodiments, for example, the example shown in FIG. 5, selects a link 508 in order to be provided with current account balance information. Such an arrangement may be used, for example, to avoid situations where the user is in the process of checking out at a point of sale, and the amount of time required to retrieve updated balance information creates undesirable delays in the checkout process. In addition to showing balance information, other information may also be displayed for the payment account(s) displayed to the user. For example, if the user receives rewards points in connection with usage of a particular credit in payment transactions, the current rewards points balance may also be displayed in the same manner as described above for account balance information.

Once the default payment account is selected, the user may interact with button 510 to send the information to the mobile wallet computing system 106. When the selection of the button 510 is received, the received selection triggers completion of the registration process based on the information received from the user.

Figure 6:
FIG. 6 is an interface that may be presented on a display of the registration terminal of FIG. 1 to confirm that a user is registered for a mobile wallet account, according to an example embodiment.

Referring again to FIG. 2, at 210 the mobile wallet computing system completes registration of the user for use of a mobile wallet account. The mobile wallet account may be generated based on the user registration information. The user and any information provided by the user may be associated with the mobile wallet account. In some embodiments, the user information is used to generate a user profile which may be associated with the mobile wallet account. At 212, the mobile wallet account is stored. The mobile wallet account may be stored in the accounts database 134. The mobile wallet computing system 106 may send a confirmation message to the registration terminal 108 when the user is registered. For example, FIG. 6 shows an interface 600 that may be presented to the user when the user is registered for a mobile wallet account. The interface 600 includes a registration message 602 indicating that the user is registered. The message 602 includes button 604 which the user may interact with to view further information related to the mobile wallet account.

Figure 7:
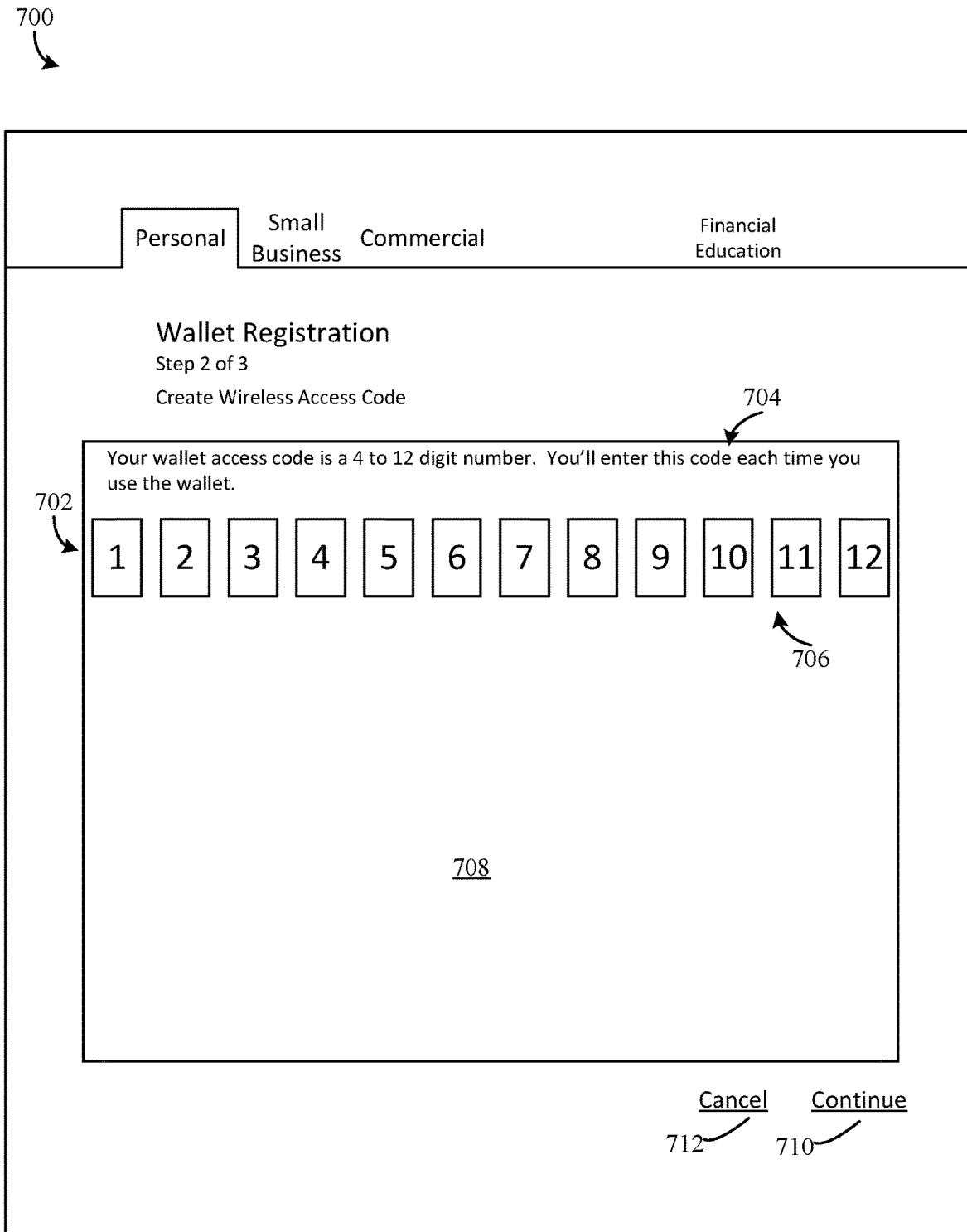
FIG. 7 is another interface that may be presented on a display of the registration terminal of FIG. 1 to enable a user to select an access code for a mobile wallet account, according to an example embodiment.
Figure 8:
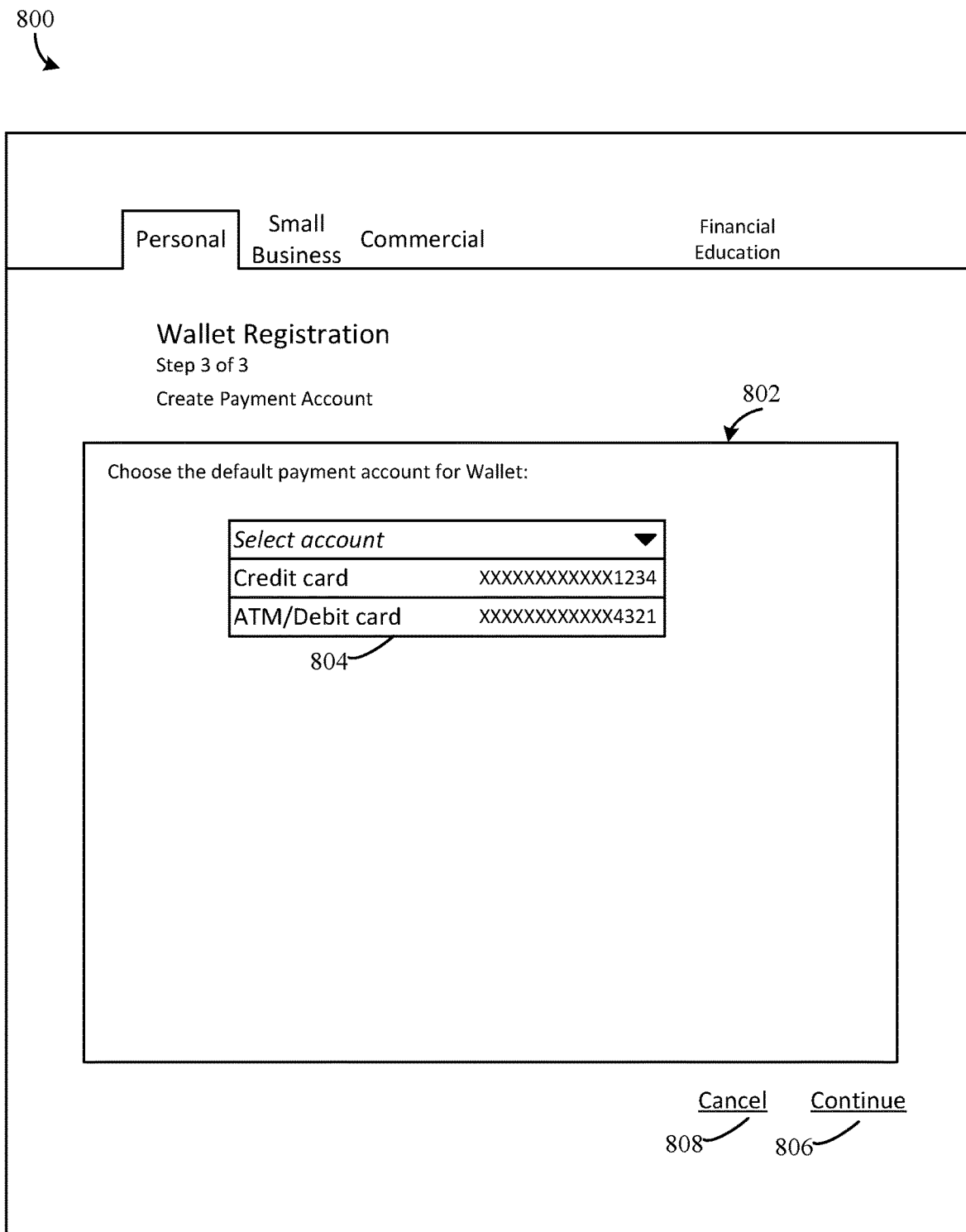
FIG. 8 is another interface that may be presented on a display of the registration terminal of FIG. 1 to enable a user to select a default payment method for a mobile wallet account, according to an example embodiment.
Figure 9:
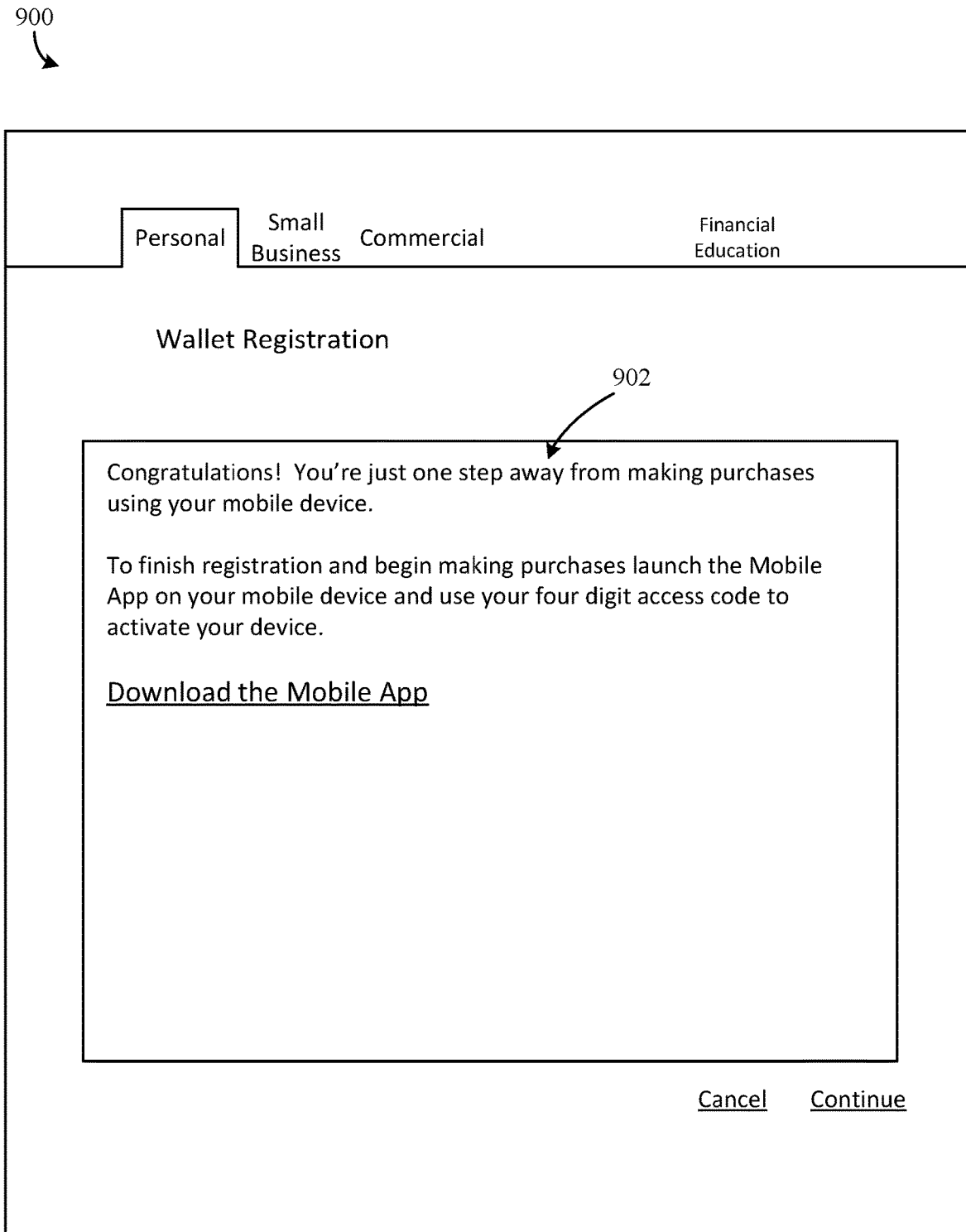
FIG. 9 is another interface that may be presented on a display of the registration terminal of FIG. 1 to confirm that a user is registered for a mobile wallet account, according to an example embodiment.
Figure 10:
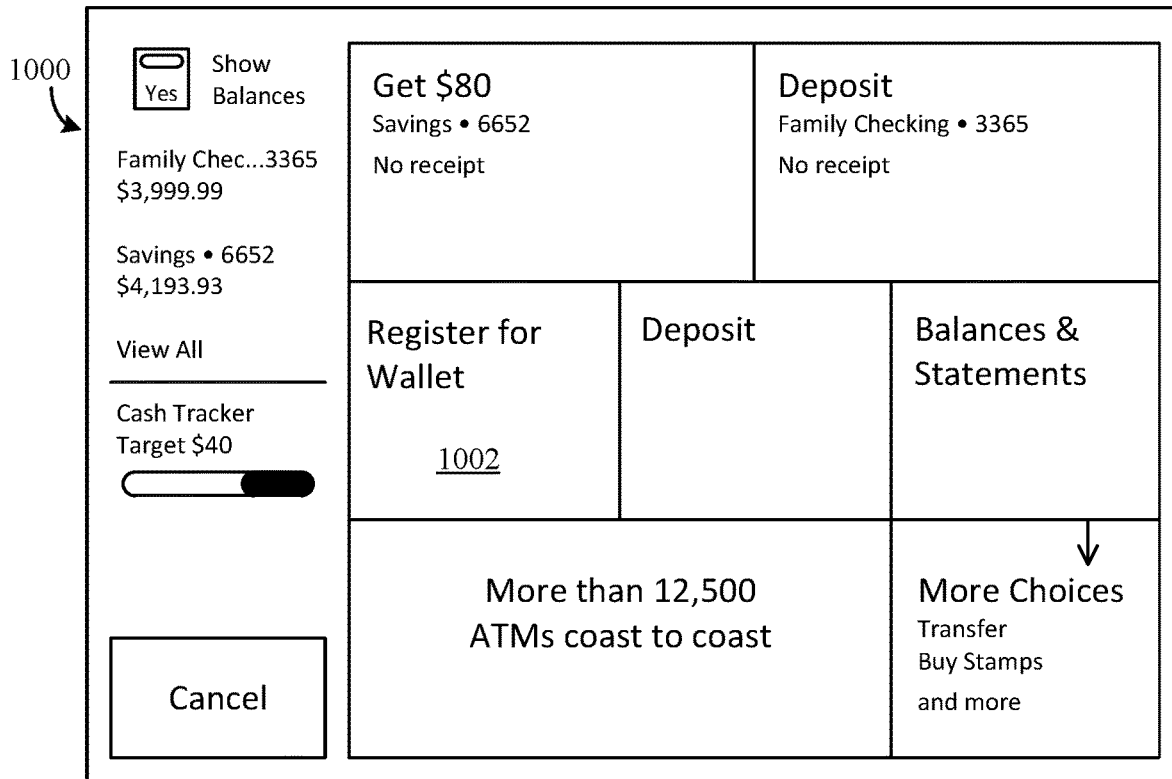
FIG. 10 is yet another interface that may be presented on a display of the registration terminal of FIG. 1 to enable a user to register for a mobile wallet account, according to an example embodiment.

Turning now to FIGS. 7-14, other examples of registering the user for use of a mobile wallet account are shown, according to example embodiments. In contrast to FIGS. 3-6 which depict user registration via a mobile application, FIGS. 7-9 show user registration via a web browser and FIGS. 10-14 show user registration through an ATM.

Referring specifically now to FIGS. 7-9, instead of using a mobile application to register for use of a mobile wallet account, the user registers using a web browser. The user (or bank teller assisting the user) can access a web browser for registration on any device that is capable of accessing or communicating with the mobile wallet computing system 106.

After receiving a request to register for the mobile wallet account and authenticating the user as described in FIG. 2 above, the mobile wallet computing system 106 prompts the user to create a wallet access code. For example, to create a wallet access code, the user is presented with an interface 700 of FIG. 7. The interface 700 includes a field 702 for setting the wallet access code. In some embodiments and as shown, the field 702 includes indicia (e.g., text) to instruct the user of the parameters of the wallet access code and the purpose of the wallet access code. For example, field 704 may instruct the user to select a wallet access code that is a 4-to-12 digit number. In other embodiments, other or additional restrictions may be set for the wallet access code. For example, in some embodiments, the wallet access code can include letters and special characters in addition to or instead of digits. The length of the wallet access code may vary as well in some embodiments. The field 704 also informs the user that the wallet access code is needed to access the user's mobile wallet account after registration. This serves as a cue to the user to select a wallet access code that the user may remember afterwards. Other or additional instructions may be displayed in the field 704.

In addition to the field 704, the field 702 includes a field 706 to permit or enable the user to select a wallet access code. In the example of FIG. 7 shown, the field 706 includes a series of buttons that the user may interact with (e.g., press, click, or drag) to select a wallet access code. The order, arrangement, as well the size of the buttons in the field 706 is exemplary and may be varied as desired. In some embodiments, once the user selects a wallet access code (e.g., by interacting with the buttons in the field 706), the selected wallet access code is displayed in the area 708 of the field 702. Also, in some embodiments, the user is directed to confirm the selected wallet access code. Once the user is satisfied with the selected wallet access code, the user continues the registration process by sending the wallet access code to the mobile wallet computing system 106 via button 710. The user may also decide not to register for a mobile wallet account by interacting with button 712.

After setting a wallet access code and sending the wallet access code to the mobile wallet computing system 106, the user is prompted to select a default payment account for use with the mobile wallet account. For example, FIG. 8 shows an interface 800 that is presented to the user for setting a default payment method. Similar to the interface 500, the interface 800 includes a payment account area 802 with a drop-down menu 804. The drop-down menu 804 includes information of one or more of the user's payment accounts that may be eligible to participate in the mobile wallet account program. The payment accounts show information such as account number, account balance, etc. In some embodiments, the drop-down menu 804 is configured to pre-select one or more default payment account(s) for the user, as described in FIG. 5 above. After selecting a payment method(s), the user can save his/her preferences with the mobile wallet computing system 106 by interacting (e.g., pressing or clicking) with button 806. Alternatively, the user may decide not to continue registration of the mobile wallet account by interacting with button 808.

Once the user has selected a wallet access code and a default payment method, the user is registered for a mobile wallet account. The user may then be notified of next steps in the registration process by an interface 900, shown in FIG. 9. As shown in FIG. 9, the interface 900 includes a registration confirmation area 902. In some embodiments, the registration confirmation area 902 includes indicia (e.g., text and/or images) that convey what the user needs to do to register the user's mobile device for use with the mobile wallet account. For example, the registration confirmation area 902 may include a link to facilitate the user to register his/her mobile device with the mobile wallet account. In other embodiments, different or additional information is provided to the user to prompt the user to register their mobile device.

Turning now to FIGS. 10-14, yet another example of registering the user for using a mobile wallet account is shown, according to an example embodiment. Specifically, FIGS. 10-14 show how to register a user via an ATM. After initiating an authenticated session at the ATM, the user is directed to an interface 1000 of FIG. 10. It is to be understood that the interface 1000 is merely exemplary. The type, size, shape, and the overall content of widgets in the interface 1000 may vary from one embodiment to another. From the interface 1000, a user is able to register for a mobile wallet account through widget 1002.

Figure 11:
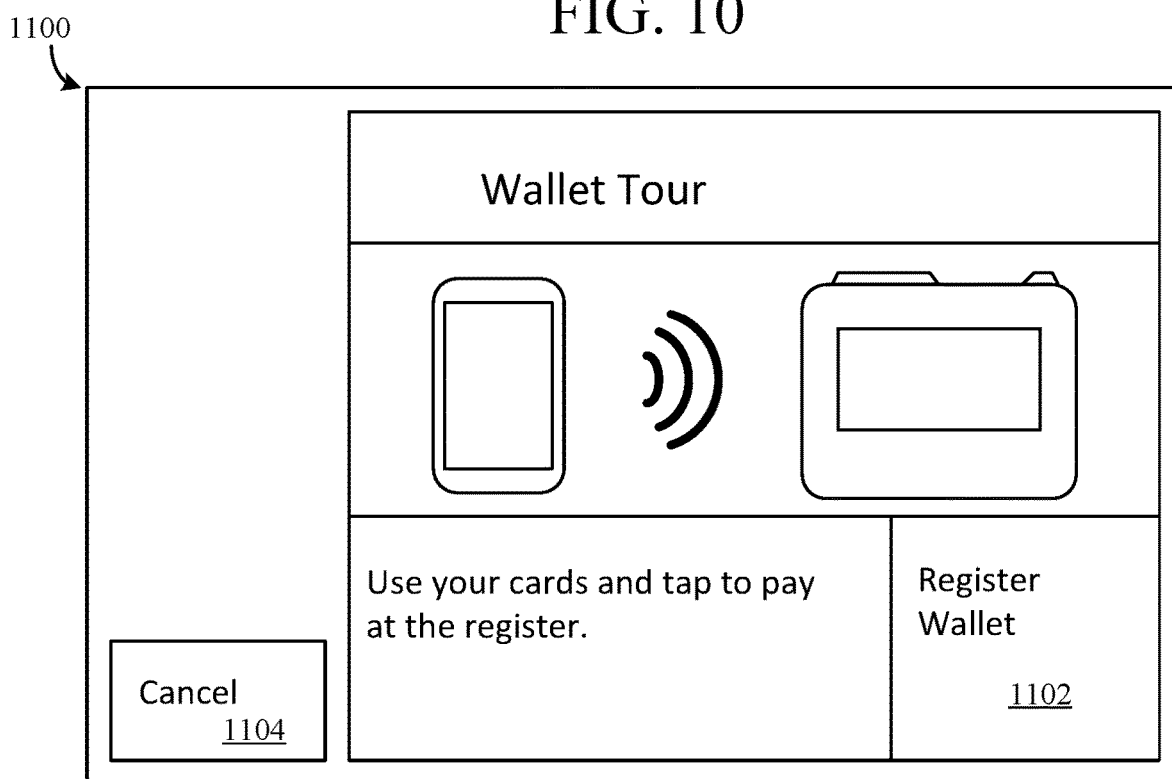
FIG. 11 is yet another interface that may be presented on a display of the registration terminal of FIG. 1 to enable a user to register for a mobile wallet account, according to an example embodiment.
Figure 12:
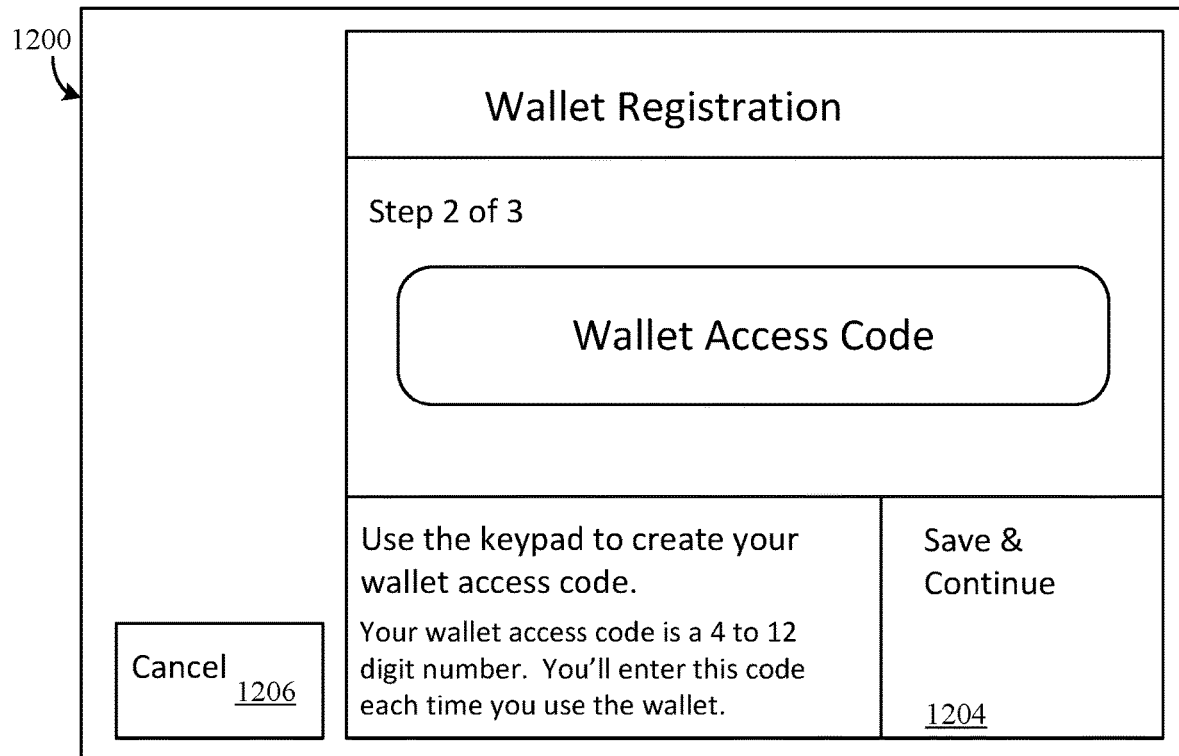
FIG. 12 is yet another interface that may be presented on a display of the registration terminal of FIG. 1 to enable a user to select an access code for a mobile wallet account, according to an example embodiment.

Upon accessing the widget 1002 either by clicking on the widget or performing other designated interaction with the widget, the user is directed to interface 1100 of FIG. 11. The interface 1100 provides a brief overview of the purpose and design of mobile wallet account via text, images, and/or other indicia. The interface 1100 may be useful to a user who is unfamiliar with the mobile wallet account program. Again, the content and design of the interface 1100 can vary from one embodiment to another. If the user decides to register for a mobile wallet account, the user interacts (e.g., click) with button 1102. If the user decides not to register for the mobile wallet account, the user clicks on button 1104 to go back to the interface 1000. After interacting with the button 1102, the user is directed to interface 1200 of FIG. 12 to select a wallet access code.

In some embodiments, the user uses the keypad of the ATM to select a wallet access code. In other embodiments, the interface 1200 itself includes a keypad that the user may use to select a wallet access code. Once the user selects a wallet access code, the wallet access code is displayed in field 1202. If the user is satisfied with the selected wallet access code, the user interacts with button 1204 to send the wallet access code to the mobile wallet computing system 106 for future use. Alternatively, if the user decides not to continue with the registration of the mobile wallet account, the user can navigate back to the interface 1000 by interacting with button 1206.

Figure 13:
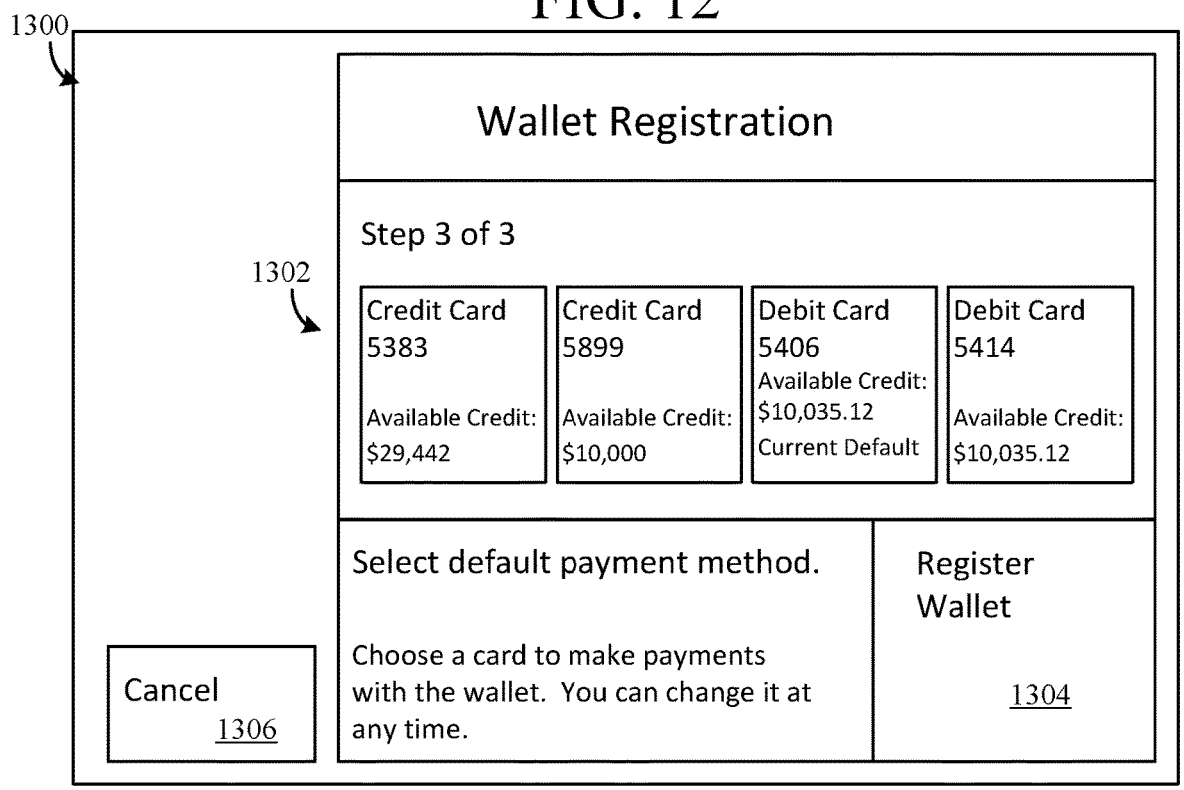
FIG. 13 is yet another interface that may be presented on a display of the registration terminal of FIG. 1 to enable a user to select a default payment method for a mobile wallet account, according to an example embodiment.
Figure 14:
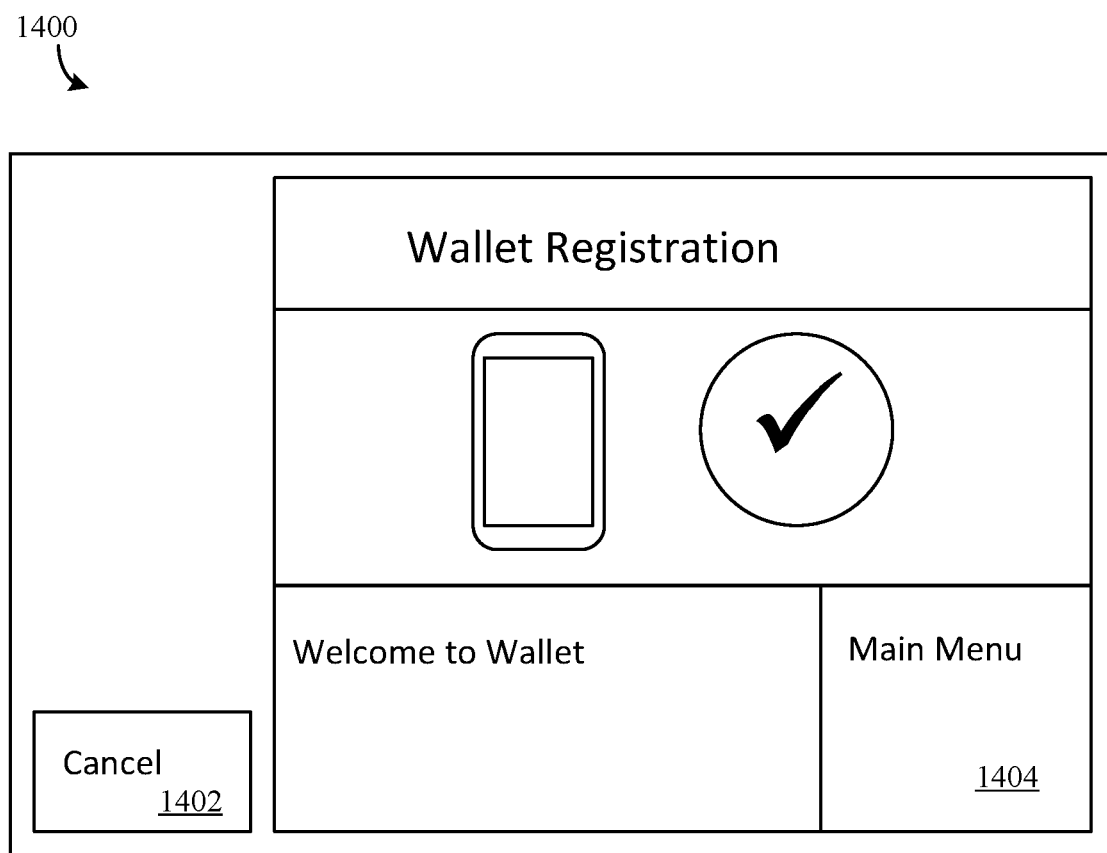
FIG. 14 is yet another interface that may be presented on a display of the registration terminal of FIG. 1 to confirm that a user is registered for a mobile wallet account, according to an example embodiment.

If the user has decided to continue with the registration of the mobile wallet account by interacting with the button 1204, the user is directed to interface 1300 of FIG. 13. The interface 1300 enables the user to set a default payment method for using the mobile wallet account. As with other methods of registration discussed above, the interface 1300 provides the user with various payment options that are available to the user to set as one or more default payment method(s). A field 1302 lists all of the available methods of payments to which the user has access. For example and as shown in the interface 1300, the user has four forms of payment methods, one or more of which the user may set for default payments. In other embodiments, more or less than four and/or different payment methods may be displayed in the field 1302, depending upon how many and what payment methods are available to the user. Each of the payment methods displays the account name, number, available balance, or other/additional details.

After selecting one or more payment method(s), the user interacts with button 1304 to register the user's mobile wallet account. The user is still able to change his/her mind and not register the mobile wallet account by interacting with button 1306. Once the user interacts with the button 1304, the user's default payment selection is sent to the mobile wallet computing system 106 to facilitate registration of the mobile wallet account and the user is taken to an interface 1400 of FIG. 14. The interface 1400 confirms registration of the user's mobile wallet account. The user may interact with button 1402 to go back to the interface 1000 or with button 1404 to view additional information relating to the user's mobile wallet account.

Figure 15:
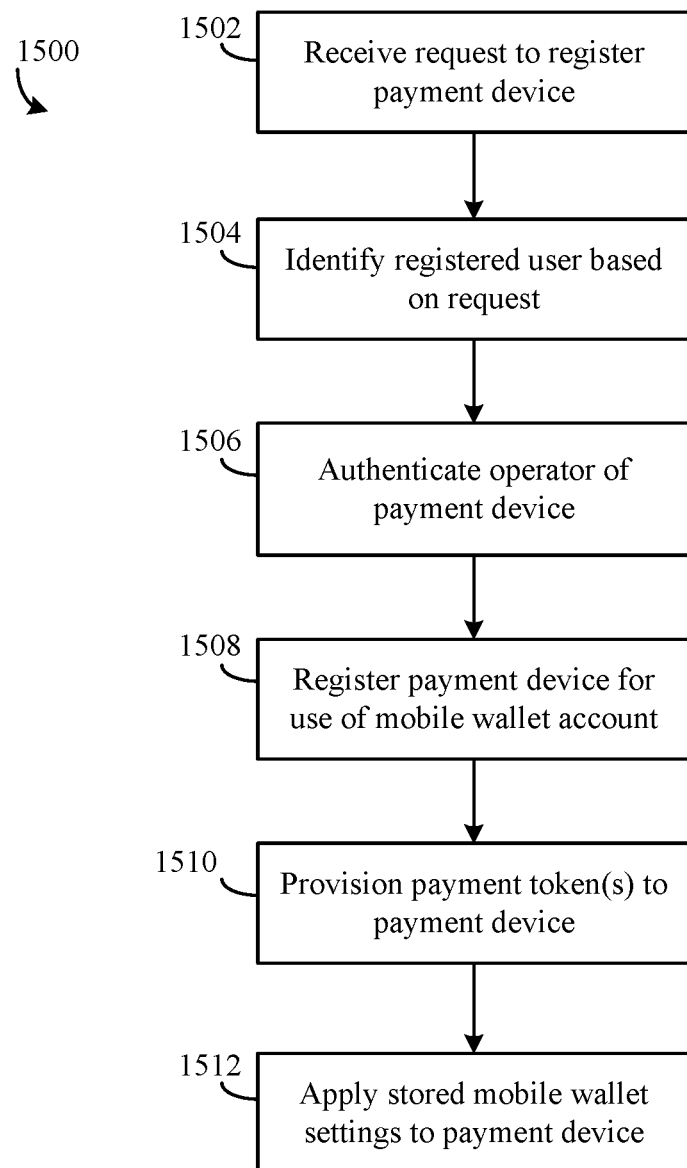
FIG. 15 is a schematic flow diagram of a process for registering a mobile device for use of a mobile wallet account using the system of FIG. 1, according to an example embodiment.

Referring now to FIG. 15, a process 1500 is shown for registering a mobile device for use with a mobile wallet account held by a registered user, according to an example embodiment. After registration of the mobile device, the mobile device is assigned to the registered user's mobile wallet account, such that the mobile device may be used to make transactions using the mobile wallet account. The process 1500 may be performed after the user is registered using process 200. Similar to process 200, the process 1500 is described as being performed by the mobile wallet computing system 106, although the steps may be performed by any of the systems and devices of system 100 in various embodiments.

At 1502, the mobile wallet computing system 106 receives a request to register the user mobile device 102 (or a different mobile device) for use of a mobile wallet account (e.g., the account generated in process 200). The request is received from the user mobile device 102 (or the different mobile device). The request is received via a communication channel that is separate and distinct from the channel used to register the user (e.g., the user registration interface 142). For example, the user mobile device 102 may include a device (e.g., the user's primary cell phone) that is separate and distinct from the registration terminal 108 (e.g., an ATM machine, a banker's computer at a store location, a laptop computer that the user uses for online banking, another mobile device of the user such as a tablet, a cell phone that was previously the user's primary cell phone but which has since been lost, another secondary cell phone, etc.). In some arrangements, the request is received via an interface provided by the mobile wallet computing system 106, which may include a mobile wallet or mobile banking application operating on the user mobile device 102.

At 1504, the mobile wallet computing system 106 identifies the registered user based on the request. The mobile wallet computing system 106 may identify the registered user based on user-provided information provided with the request, which may include mobile or online banking credentials, a unique identification number, personal information such as an address or phone number, financial account information, and/or any other identifying information that may be verified by the mobile wallet computing system 106. The registered user may also be identified based on the user mobile device 102. For example, the user mobile device 102 may be assigned to the registered user such that the mobile wallet computing system 106 can identify the registered user based on the device 102. The mobile wallet computing system 106 may also identify the associated mobile wallet account, a user profile, and any preferences associated with the registered user.

At 1506, the mobile wallet computing system 106 authenticates the operator of the user mobile device 102. The operator is authenticated to verify that the operator of the user mobile device 102 is the registered user, or is otherwise authorized to use the mobile wallet account of the registered user. The operator is authenticated based on authentication information received from the registered user via the user mobile device 102. The mobile wallet computing system 106 may request the authentication information prior to receipt of the information. For example, the mobile wallet computing system 106 may request the authentication information (e.g., via the user mobile device 102) upon identifying the registered user. The operator may be authenticated to the registered user's mobile wallet account based on information provided by the registered user during user registration. For example, the operator may be authenticated based on the registered user's wallet access code. The information that is required to authenticate the operator may be specified by the registered user (e.g., during user registration). The mobile wallet computing system 106 authenticates the operator by matching the authentication information received via the user mobile device 102 to the information previously provided by the registered user.

At 1508, the mobile wallet computing system 106 registers the user mobile device 102 for use with the registered user's mobile wallet account. The user mobile device 102 may be registered upon authenticating the operator of the user mobile device 102. Registering the user mobile device 102 may include assigning the user mobile device 102 to the mobile wallet account of the registered user, such that the user mobile device 102 may be used to transact from the registered user's mobile wallet account. Registering the user mobile device 102 may also include implementing the mobile wallet circuit 114 on the user mobile device 102. For example, the mobile wallet computing system 106 may cause a mobile wallet application to be installed on the user mobile device 102, enabling a secure exchange of information between the mobile wallet computing system 106 and the user mobile device 102. The mobile wallet circuit 114 may enable the user mobile device 102 to execute transactions from the registered user's mobile wallet account.

At 1510, one or more payment tokens are provisioned to the user mobile device 102. The one or more payment tokens are generated based on the one or more source financial accounts associated with the user's mobile wallet account. The payment tokens may be used by the user mobile device 102 to initiate a financial transaction from a source financial account of the registered user. The payment tokens may be provisioned by the mobile wallet computing system 106 and/or the token service provider 110. In some arrangements, the payment tokens are generated and stored with the registered user's mobile wallet account when the user is registered. The payment tokens are then provisioned to the user mobile device 102 when the user mobile device 102 is registered. The payment tokens may be stored in memory of the user mobile device 102, which may include a secure element or host card emulation (HCE). The user mobile device 102 may provide a destination address or location to the mobile wallet computing system 106 prior to the tokens being provisioned to the user mobile device 102.

At 1512, the mobile wallet computing system 106 applies any settings or preferences associated with the registered user to the user mobile device 102. For example, the mobile wallet computing system 106 may apply to the user mobile device 102 the terms and conditions, selected source accounts, selected default account, any transaction limits, user preferences, etc., associated with the registered user's mobile wallet account. In some arrangements, a user profile is generated based on the information received from the registered user during registration of the user. This user profile may then be applied to the user mobile device 102. In some arrangements, the user profile may be updated by the registered user via the registration terminal 108 or the registered user mobile device 102. If the updates are applied using the registration terminal 108 (or by another channel separate from the user mobile device 102), the mobile wallet computing system 106 may automatically apply the updates to the user mobile device 102.

Figure 16:
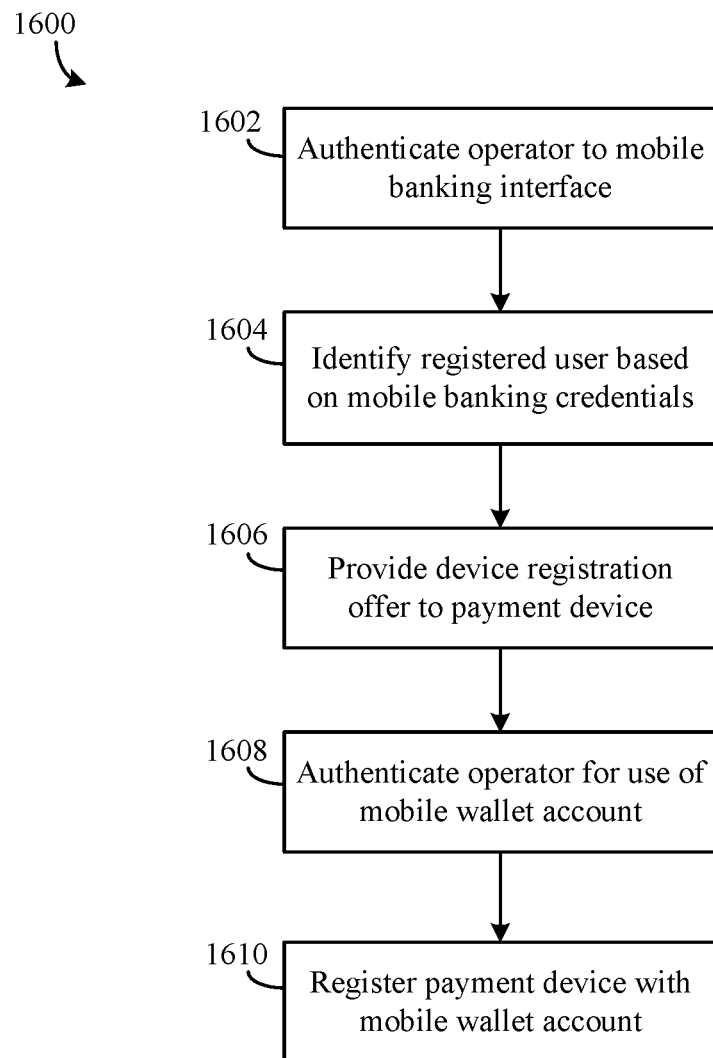
FIG. 16 is a schematic flow diagram of another process for registering a mobile device for use of a mobile wallet account by a mobile banking interface using the system of FIG. 1, according to an example embodiment.

Referring now to FIG. 16, a process 1600 is shown for registering a mobile device for use of a mobile wallet account held by a registered user, according to an example embodiment. The process 1600 may be similar in many respects to the process 1500, however, process 1600 is described in the context of the specific example of FIGS. 17-20. The process 1600 may be performed after the user is registered using process 200. The process 1600 may be performed by a mobile wallet provider, which may include an issuing financial institution or a third party mobile wallet provider. The process 1600 is described herein as being performed using the mobile wallet computing system 106, which is operated by the mobile wallet provider. However, in various embodiments, the steps of process 1600 may be performed using any of the systems and devices shown in the mobile wallet registration system 100, alone or in any combination. Further, each of the systems and devices of system 100 may be at least partially operated by the mobile wallet provider.

In the example embodiment described herein, the mobile wallet provider is an issuing financial institution that provides one or more source financial accounts to the user. Thus, any steps of the process 1600 may be similarly performed by the financial institution computing system 104, which is also operated by the mobile wallet provider (i.e., the issuing financial institution) in this embodiment. In reference to process 1600, the mobile wallet computing system 106 may also refer to a computing system that performs the functions, and includes similar components, of both the mobile wallet computing system 106 and the financial institution computing system 104.

Figure 17:
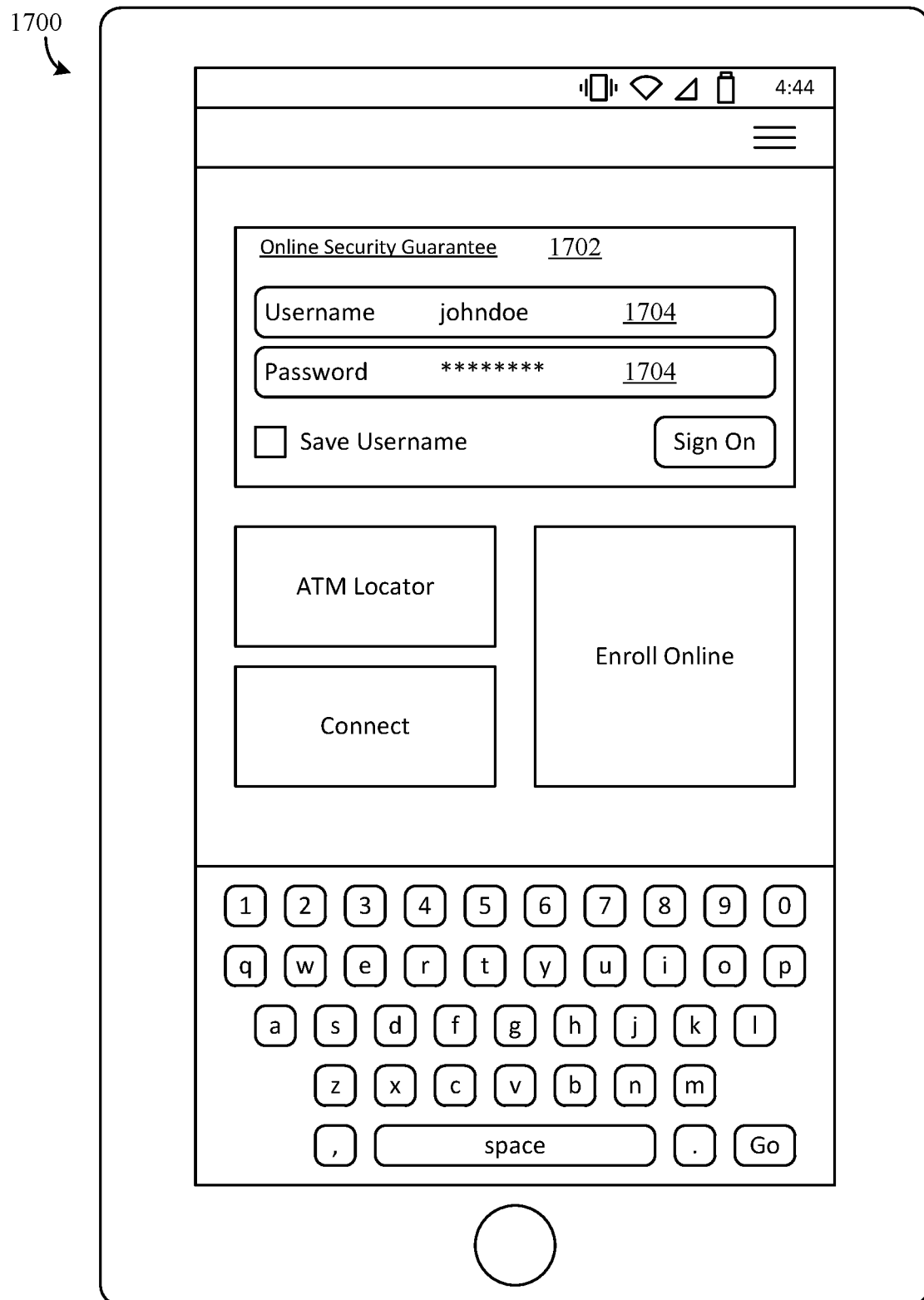
FIG. 17 is an interface that may be presented on a display of the user mobile device of FIG. 1 to enable a user to provide authentication information, according to an example embodiment.

At 1602, the mobile wallet computing system 106 authenticates an operator of the user mobile device 102 (or another mobile device) to the mobile device client application 120 operating on the user mobile device 102. In this embodiment, the mobile device client application 120 includes a mobile banking interface provided by the mobile wallet computing system 106 (i.e., the issuing financial institution). The operator authenticates to the mobile banking interface using authentication credentials associated with the registered user's one or more financial accounts. As an example, FIG. 17 shows an interface 1700 that may be presented on the user mobile device 102 to authenticate the user. The interface 1700 includes an authentication area 1702. The authentication area 1702 includes fields 1704 for entering authentication credentials. In this embodiment, the fields 1704 include fields for a username and password associated with the user. Once the credentials are provided, the mobile wallet computing system 106 authenticates the operator based on the credentials, enabling access to a mobile banking area for managing one or more financial accounts of the user.

In some embodiments, the authentication that is required is context-dependent. For example, some users may configure their mobile device (e.g., cell phone) such that authentication (e.g., a password, a fingerprint swipe, etc.) is required in order to access any features beyond a lock screen. For such users using such devices, no additional authentication may be required, on the assumption that the authentication required to access features beyond the lock screen is likewise sufficient for purposes of mobile wallet authentication. Other users may configure their mobile device (e.g., cell phone) such that no authentication is required in order to access its features, such that no lock screen is employed. For such users using such devices, authentication may be required given that no authentication is otherwise required.

Referring again to FIG. 16, at 1604 the mobile wallet computing system 106 identifies the registered user based on the mobile banking credentials. In some arrangements, the mobile wallet computing system 106 identifies an account holder based on the mobile banking credentials, based on a device identifier stored on the mobile device 102, or in another manner. The mobile wallet computing system 106 then retrieves stored information for the account holder (e.g., from accounts database 124, from user accounts database 134) to determine that the account holder is a registered user of a mobile wallet account. For example, the account holder may be identified as a registered user based on a stored user profile that was created while the user was registering at a branch location, via an ATM, or in another manner.

After identifying the registered user (and the associated mobile wallet account), at 1606 the mobile wallet computing system 106 provides a device registration offer to the user mobile device 102. The offer may be provided via the mobile banking interface (i.e., the mobile device client application 120). For example, as previously indicated, in some embodiments, the mobile banking application may include a mobile wallet application which may be stored on the device, but which may not be accessible by the user until the user registers for a mobile wallet account. Once the user registers for the mobile wallet account, the mobile wallet application within the mobile banking application may be activated.

Figure 18:
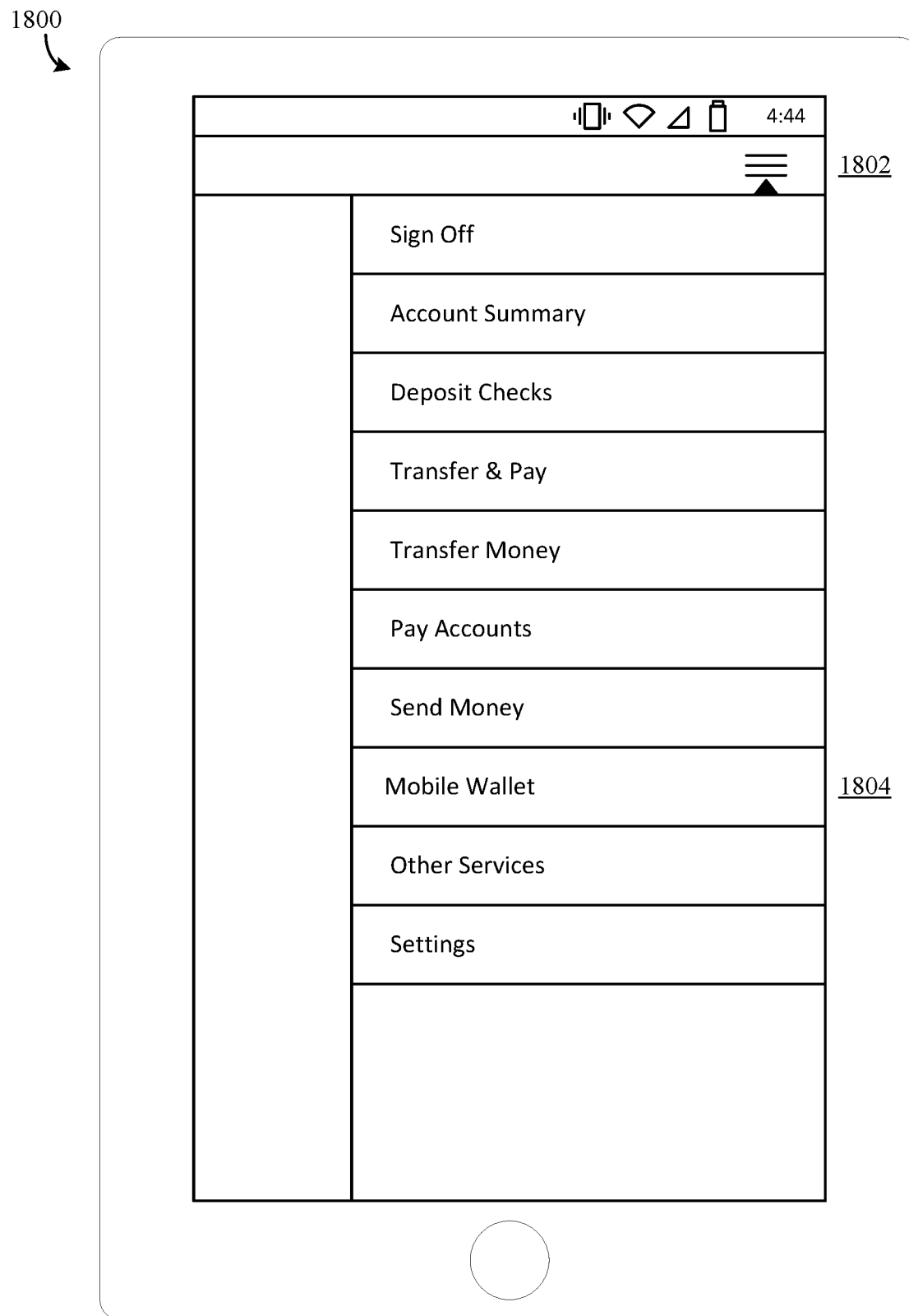
FIG. 18 is an interface that may be presented on a display of the user mobile device of FIG. 1 to enable a user to request use of a mobile wallet account from the user mobile device, according to an example embodiment.

The device registration offer may be selectable to initiate registration of the user mobile device 102 for use of the mobile wallet account (e.g., to register the device 102 with the registered user). The offer may identify the registered user, the mobile wallet account, and/or any associated source accounts. The offer may also identify any other registered devices. As an example, FIG. 18 shows an interface 1800 that may be presented on the user mobile device 102. The interface 1800 includes an options tab 1802 that includes a number of options that are selectable by the operator. In particular, the options tab 1802 includes a button 1804 labeled "Mobile Wallet." The user may interact with the button 1804 to initiate registration of the user mobile device 102 for use of an identified mobile wallet account. In some embodiments, the interface 1800 is activated on the user mobile device 102 in response to identification of the registered user. For example, the mobile wallet computing system 106 may cause the device registration offer to be displayed on the user mobile device 102, including by activating the mobile device client application 120.

Referring again to FIG. 16, at 1608 the mobile wallet computing system 106 authenticates the user mobile device 102 (e.g., the operator of the user mobile device 102) for use of the identified mobile wallet account. The user mobile device 102 is authenticated based on information received from the user via the user mobile device 102. The authentication information may include any information associated with the registered user and/or the mobile wallet account. The authentication information may be requested by the mobile wallet computing system 106 in response to a request to register the user mobile device 102 (e.g., acceptance of an offer to register the user mobile device 102). In the example embodiment, the user mobile device 102 is authenticated based on the wallet access code that was created during user registration. The wallet access code may be provided by the operator using the mobile banking interface.

Figure 19:
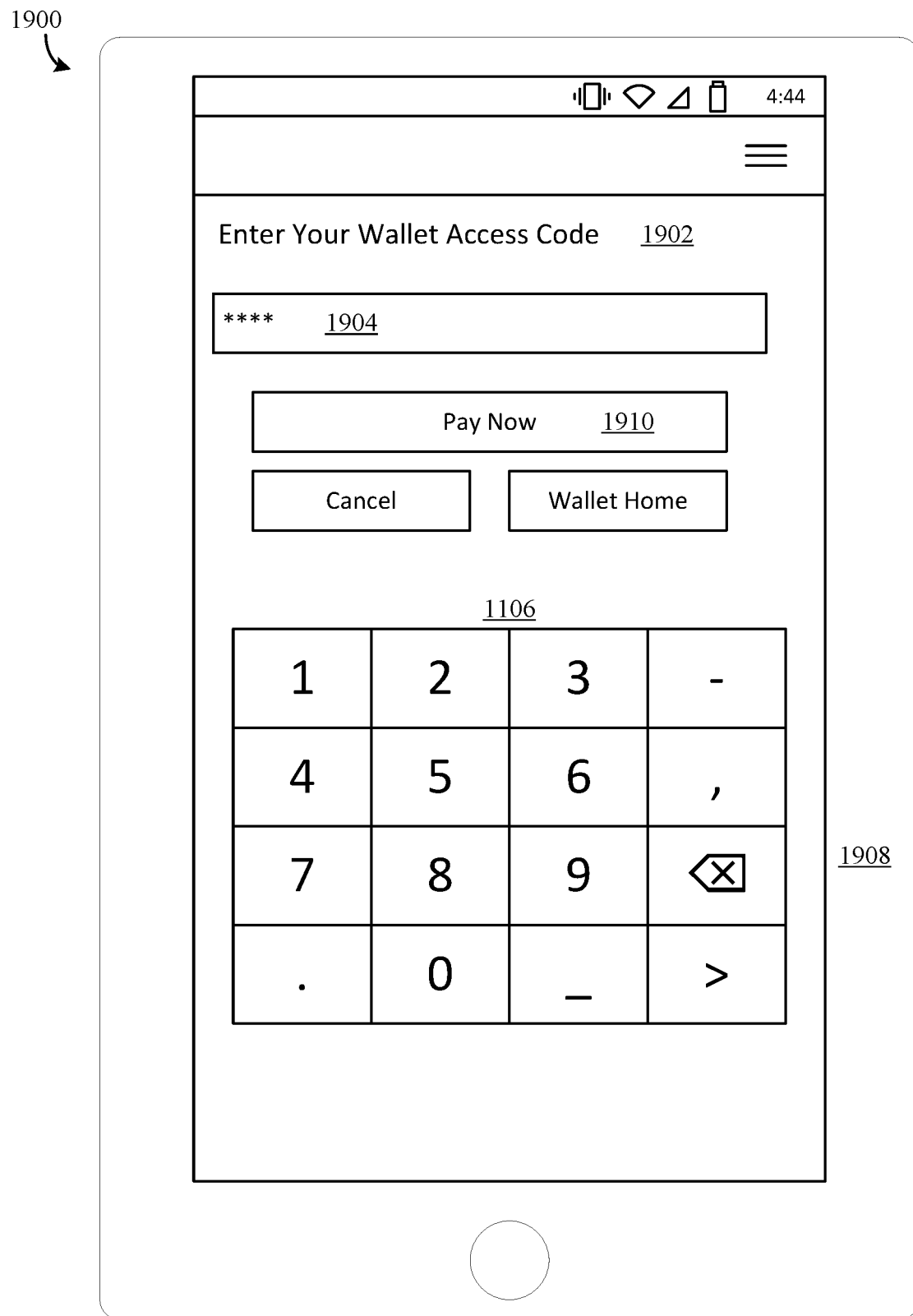
FIG. 19 is an interface that may be presented on a display of the user mobile device of FIG. 1 to enable a user to provide a wallet access code, according to an example embodiment.

As an example, FIG. 19 shows an interface 1900 that may be presented on the user mobile device 102. The interface 1900 includes a message area 1902 from the mobile wallet computing system 106. In this embodiment, the message area 1902 includes text asking the operator to enter the wallet access code, but the message area 1902 may be utilized in other embodiments to request any required authentication information. The interface 1900 also includes a field 1904 for providing the wallet access code. The wallet access code may be entered by interacting with number pad or key pad 1906. The wallet access code may be sent to the mobile wallet computing system 106 by selecting button 1908. In this embodiment, the interface 1900 also includes a button 1910 for making a payment using the mobile wallet account. For example, the user mobile device 102 may be registered to the mobile wallet account when a payment is requested to be made using the user mobile device 102. The payment may then be executed by entering the wallet access code and pressing the button 1910.

Referring again to FIG. 16, once the operator and/or the user mobile device 102 are authenticated, the user mobile device 102 is registered with the registered user's mobile wallet account. Registration may include provisioning payment tokens based on the one or more source accounts. Registration may also include implementing any preferences and settings associated with the registered user, such as any information stored within a user profile. Such information may include terms and conditions, source payment accounts, a default payment account, transaction limits, and the like. Once registered, the user mobile device 102 is associated with the registered user and the registered user's mobile wallet account. The user mobile device 102 may then be used to make payments from the registered user's mobile wallet account (e.g., from the source accounts provisioned to the device 102).

Figure 20:
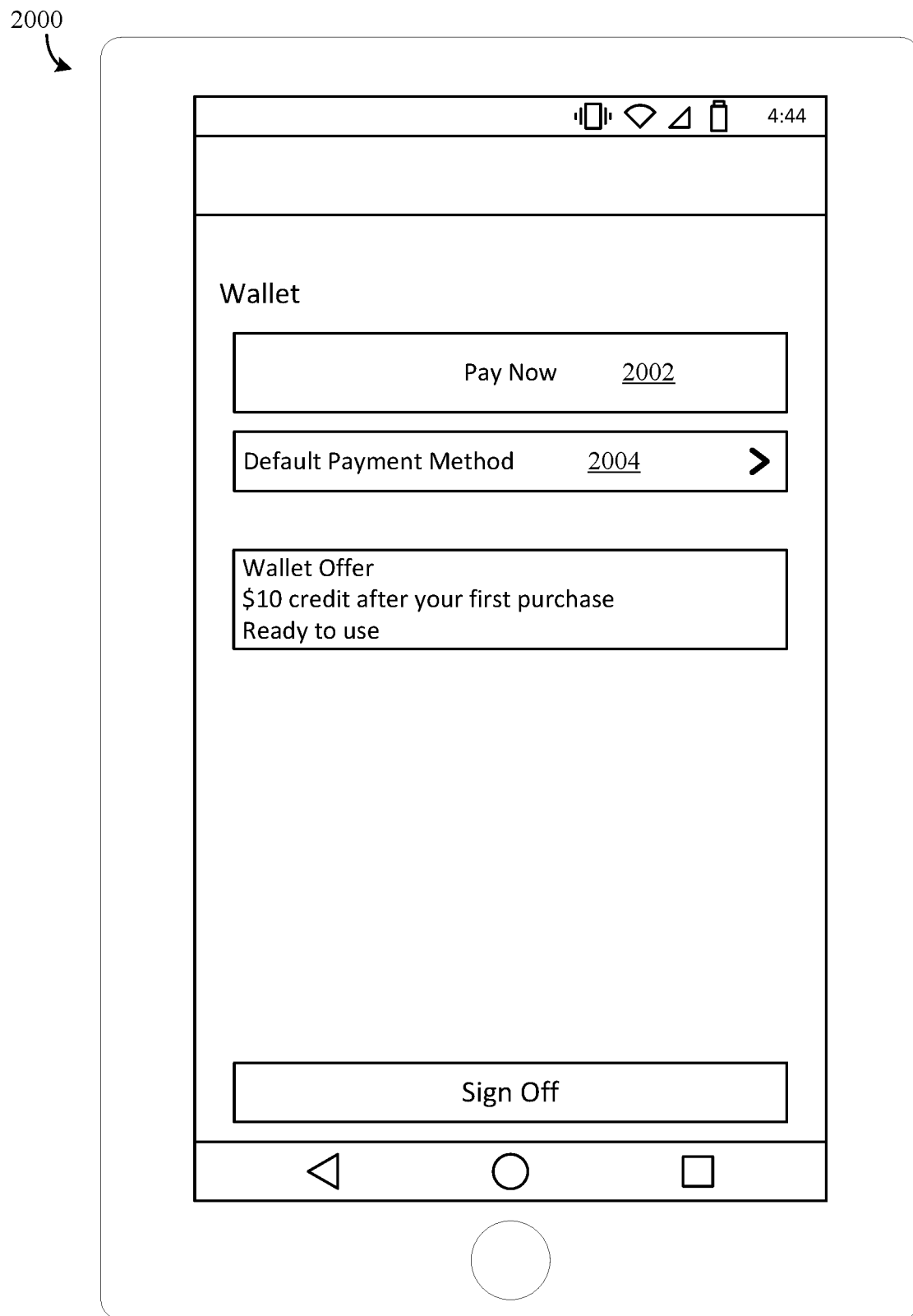
FIG. 20 is an interface that may be presented on a display of the user mobile device of FIG. 1 to enable a user to make a payment from the registered user mobile device, according to an example embodiment.
Figure 21:
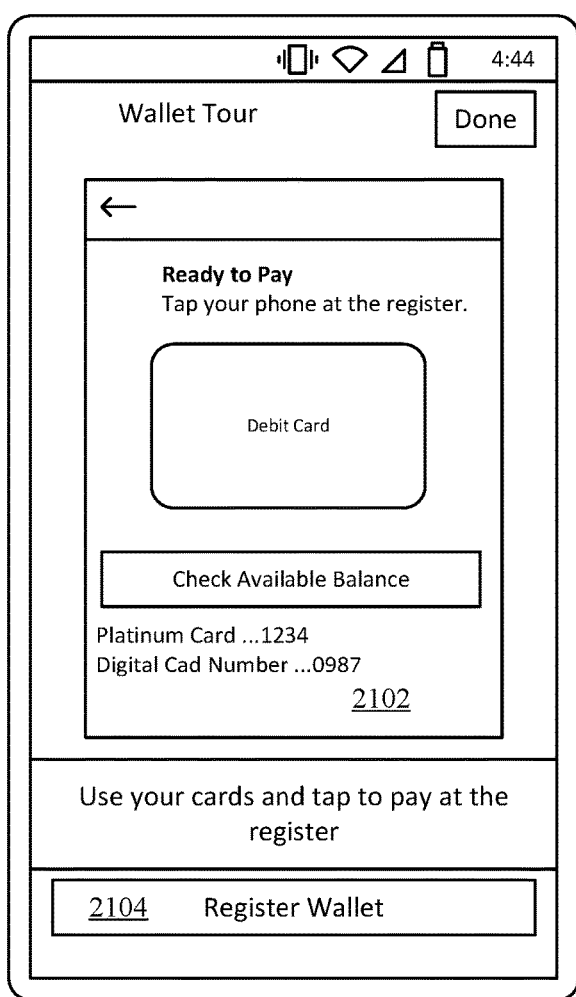
FIG. 21 is another interface that may be presented on a display of the user mobile device of FIG. 1 to enable a user to request use of a mobile wallet account from the user mobile device, according to an example embodiment.

Referring to FIG. 20, an interface 2000 is shown that may be presented on the user mobile device 102 upon registration of the device 102. The interface 2000 includes a button 2002 that the operator may interact with to make a payment using the associated mobile wallet account. The interface 2000 also includes a dropdown menu 2004 that may be utilized to select a new source account as the default source account. The user profile including preferences are stored at the mobile wallet computing system 106 ("in the cloud"). Hence, if the user selects a new source account (or changes any other preferences), the change(s) are then stored at the mobile wallet computer system 106. Subsequently, those changes may be automatically propagated to other devices used to access the mobile wallet account.

Turning now to FIGS. 21-25, another example of registering a user's mobile device is shown, according to an example embodiment. To register a user's mobile device, the user of a registered mobile wallet account is first identified, as discussed above with respect to FIG. 8. After identifying the user and the mobile wallet account associated with the user, the user's mobile device is registered using an interface 2100 of FIG. 21. The interface 2100 may be accessed through the mobile banking interface (e.g., the mobile device client application 120). The interface 2100 includes a field 2102 listing all of the payment methods that are available to the user for use with the mobile wallet account. In one embodiment, the default payment method(s) selected by the user when registering for the mobile wallet account are highlighted to remind the user of the default payment method(s). In at least some embodiments, the user is able to change the default payment method(s), check balance of one or more of the payment methods listed in the field 2102, and/or perform other operations. The interface 2100 also includes a button 2104 to initiate registration of the user's mobile device for use with the mobile wallet account.

Figure 22:
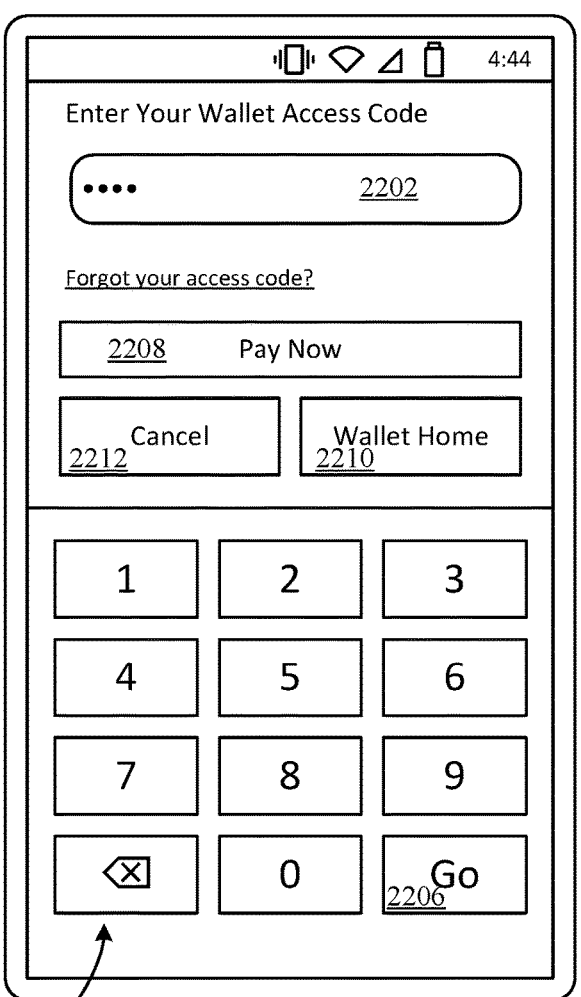
FIG. 22 is another interface that may be presented on a display of the user mobile device of FIG. 1 to enable a user to provide a wallet access code, according to an example embodiment.

Specifically, the user interacts (e.g., click) with the button 2104 to open interface 2200 of FIG. 22. The interface 2200 prompts the user to the enter the wallet access code that the user selected when registering for the mobile wallet account in FIGS. 2-14 above. The interface 2200 includes a field 2202 where the wallet access code is displayed, either in visible or hidden form, and a keypad 2204 that the user uses to enter the wallet access code. In at least some embodiments, if the user's mobile device has a keypad, the user is able to use the keypad of the device to enter the wallet access code as well. After entering the wallet access code, the user interacts with button 2206 to send the wallet access code to the mobile wallet computing system 106 for verification. Again, as discussed in FIG. 11 above, the interface 2100 also includes a button 2208 that the user can use to make a payment using the mobile wallet account after the user's mobile device is registered to make payments. Thus, when the user's mobile device is a registered device, after entering the wallet access code in the field 2202, the user interacts with the button 2208 to make a payment. In at least some embodiments, the button 2208 is disabled until the user has registered the user's mobile device with the mobile wallet account. In other embodiments, the button 2208 may do nothing, return an error message, or other message reminding the user to register the user's mobile device, if the user interacts with the button 2208 before registering the user's mobile device.

The user can also choose to go back to the interface 2100 by interacting with button 2210 or choose not to register the mobile device (or make a payment later if the mobile device is already registered) by interacting with button 2212.

Figure 23:
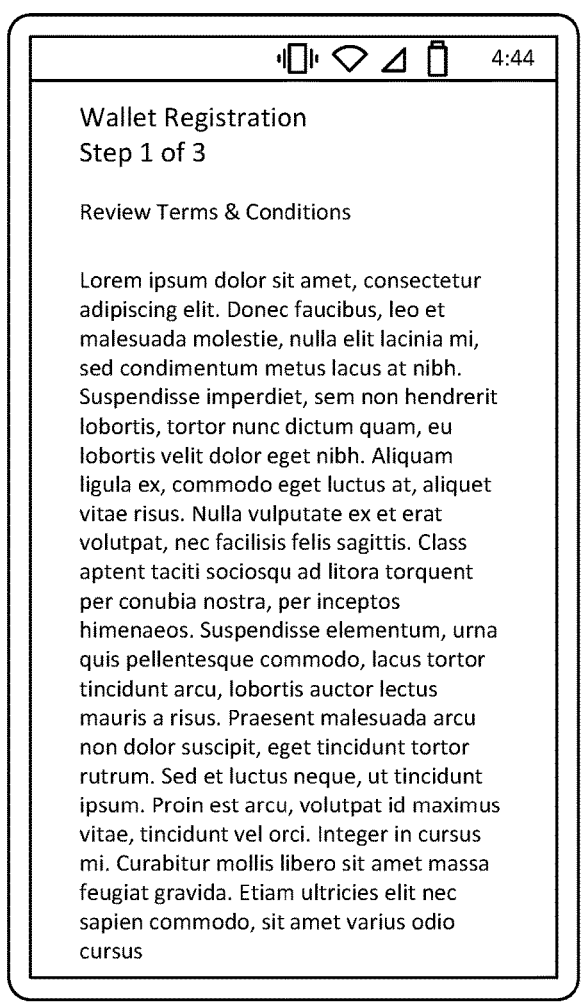
FIG. 23 is another interface that may be presented on a display of the user mobile device of FIG. 1 to enable a user to access terms and conditions for review, according to an example embodiment.
Figure 24:
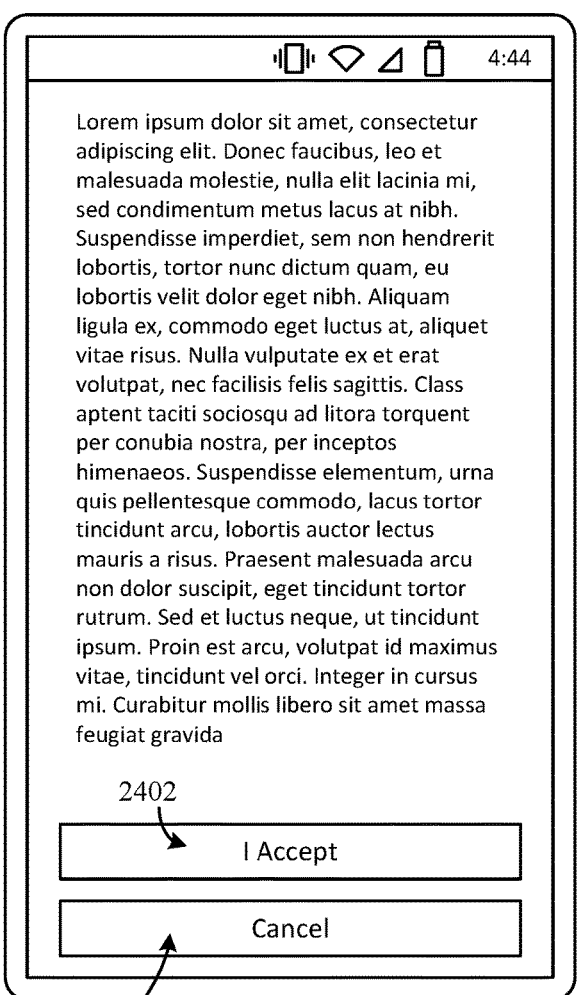
FIG. 24 is another interface that may be presented on a display of the user mobile device of FIG. 1 to enable a user to accept the terms and conditions, according to an example embodiment.

If the user entered a valid wallet access code in the field 2202 in the interface 2200, the user is directed to interfaces 2300 and 2400 of FIGS. 23 and 24, respectively. The interfaces 2300 and 2400 spell out terms and conditions of using the mobile wallet account. The user may be required to accept the terms and conditions before the registration of the mobile device is completed. The terms and conditions can be presented for the user's review in one or more languages. Additionally, in some embodiments, the user is required to accept the terms and conditions once at the time of registering the mobile device and any time thereafter the terms and conditions change. In other embodiments, the user is required to accept the terms and conditions every time or occasionally that the user desires to use the mobile wallet account for making a payment. In these embodiments, the interfaces 2300 and 2400 are displayed after the user interacts with the button 2208. Further, the type of the terms and conditions in the interface 2300 and 2400 can vary from one embodiment to another. For example, in one embodiment, the terms and conditions in the interfaces 2300 and 2400 may be a click wrap type of agreement, while in another embodiment, the terms and conditions may be a browse wrap type of agreement. Other types of terms and conditions may be used in other embodiments. Likewise, the content of the terms and conditions are variable.

It is to be understood that although the terms and conditions have been shown in two separate interfaces (e.g., the interface 2300 and 2400) in the present embodiment, the terms and conditions are typically part of a single interface. The terms and conditions have been shown in two separate interfaces in the present embodiment to merely show the beginning and ending of the terms and conditions agreement. The user may accept the terms and conditions in the interface 2400 by interacting with button 2402. If the user disagrees with the terms and conditions or decides not to register the user's mobile device, the user can interact with button 2404 to return to the interface 2100.

Figure 25:
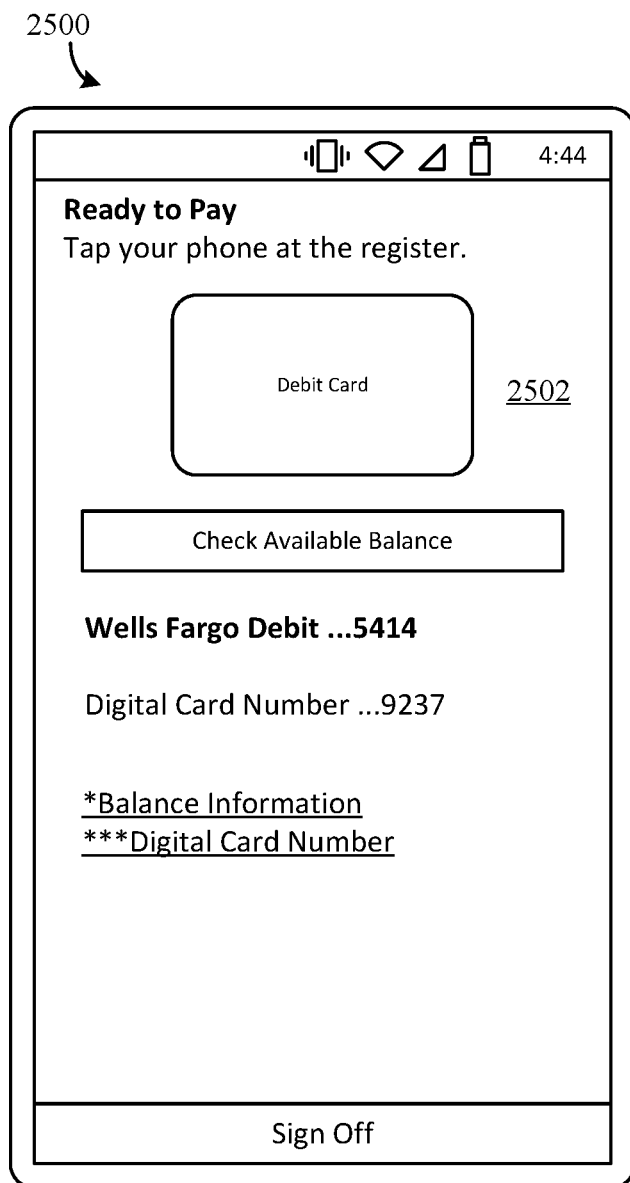
FIG. 25 is another interface that may be presented on a display of the user mobile device of FIG. 1 to confirm registration of the user mobile device and to enable a user to make a payment from the registered user mobile device, according to an example embodiment.

After accepting the terms and conditions by interacting with the button 2402, the user's mobile device is registered for use with the mobile wallet account, as shown by interface 2500 of FIG. 25. Once registered, the user is able to make payments by merely tapping his/her mobile device at the checkout register as indicated by field 2502 or by interacting with the button 2208 on the interface 2200 of FIG. 22. The user may also be able to take various actions, such as changing user preferences, checking account balance, etc.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

A given "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g, flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system, comprising:
a cloud-based mobile wallet computing system operated by a mobile wallet provider, wherein the mobile wallet computing system is connected to a plurality of user devices via a network, and wherein the mobile wallet computing system comprises:
a cloud-based memory unit configured to store a user profile; and
a cloud-based processing unit configured to:
receive, via a first communication channel, user information from a registration terminal, wherein the first communication channel comprises a communication channel between a mobile banking interface website and the cloud-based processing unit;
generate the user profile based upon the user information received from the registration terminal;
store the user profile on the cloud-based memory unit;
associate the user profile with a mobile wallet account of a user;
receive, via a second communication channel, a request for registration of a first mobile device with the mobile wallet account, wherein the second communication channel comprises a communication channel between an interface of a mobile wallet client application on the first mobile device and the cloud-based mobile wallet computing system, wherein the second communication channel is established at a separate location and a distinct time from the first communication channel, and wherein the request for registration of the first mobile device with the mobile wallet account further comprises user authentication information received via the second communication channel;
authenticate an operator of the first mobile device by matching the user authentication information received via the second communication channel to the user information received from the registration terminal via the first communication channel;
in response to, at least in part, successful authentication of the operator of the first mobile device, register the first mobile device with the mobile wallet account using the second communication channel between the mobile wallet client application on the first mobile device and the cloud-based processing unit;
apply the user profile from the cloud-based memory unit to the first mobile device via the second communication channel after registration of the first mobile device with the mobile wallet account;
receive, via the second communication channel, from the first mobile device a request to add a first payment account to the mobile wallet account;
in response to the request to add the first payment account, update the user profile to include the first payment account, wherein updating the user profile comprises:
creating a payment token associated with the first payment account; and
sending the payment token to the first mobile device;

update the user profile with the associated payment token in response to the request;
receive, via the first communication channel, a request from a second mobile device to access the mobile wallet account, wherein the request from the second mobile device includes a destination address for storage of payment tokens;
in response to the request from the second mobile device, register the second mobile device with the mobile wallet account; and
automatically apply the user profile from the cloud-based memory unit to the second mobile device via the network, wherein automatically applying the user profile comprises automatically sending the payment token associated with the first payment account to the second mobile device at the destination address for storage of the payment tokens without the user having to manually add the first payment account via the second mobile device such that the first payment account and the associated payment token are reflected in a mobile wallet application executed on the second mobile device without requiring further input from the user within the mobile wallet application.

2. The system of claim 1, wherein the mobile wallet computing system is configured to make the user profile accessible on both the first device and the second device via the network.

3. The system of claim 1, wherein the mobile wallet computing system is configured to:
receive a selection of a wallet access code, as part of the user profile, from the first device; and
register a second device of the user based upon receiving the wallet access code from the second device.

4. The system of claim 1, wherein the mobile wallet computing system is configured to:
receive an update to a default payment account from the first device;
update the default payment account in response to an update request; and
automatically apply the update to a second device of the user upon registering the second device to use the mobile wallet account.

5. The system of claim 1, wherein the mobile wallet computing system is configured to:
receive an update to a source payment account from the first device;
update the source payment account in response to an update request; and
automatically apply the update to a second device of the user upon registering the second device to use the mobile wallet account.

6. The system of claim 1, wherein the mobile wallet computing system is configured to:
update a transaction limit associated with a default payment account of the mobile wallet account; and
automatically apply the update to a second device of the user upon registering the second device to use the mobile wallet account.

7. A method, comprising:
receiving, by a mobile wallet computing system via a first communication channel, user information from a registration terminal, wherein the first communication channel comprises a communication channel between a mobile banking interface website and a cloud-based processing unit;
generating, by the mobile wallet computing system, a user profile for a mobile wallet account based on the user information received from the registration terminal;
storing, by the mobile wallet computing system, the user profile on a cloud-based memory unit;
receiving, by the mobile wallet computing system via a second communication channel, a request for registration of a first mobile device with the mobile wallet account, wherein the second communication channel comprises a communication channel between an interface of a mobile wallet client application on the first mobile device and a cloud-based processing system, wherein the second communication channel is established at a separate location and a distinct time from the first communication channel, and wherein the request for registration of the first mobile device with the mobile wallet account further comprises user authentication information received via the second communication channel;
authenticating, by the mobile wallet computing system, an operator of the first mobile device by matching the user authentication information received via the second communication channel to the user information received from the registration terminal via the first communication channel;
in response to, at least in part, successful authentication of the operator of the first mobile device, registering, by the mobile wallet computing system, the first mobile device for use of the mobile wallet account using the second communication channel between the mobile wallet client application on the first mobile device and the cloud-based processing unit, wherein registering the first mobile device includes making the user profile accessible to the first mobile device via a cloud-based network and the cloud-based memory unit;
receiving, by the mobile wallet computing system via the second communication channel, from the first device a request to add a first payment account to the mobile wallet account;
in response to the request to add the first payment account, updating, by the mobile wallet computing system, the user profile to include the first payment account, wherein updating the user profile comprises:
creating a payment token associated with the first payment account; and
sending the payment token to the first mobile device;
updating, by the mobile wallet computing system, the user profile with the associated payment token;
receiving, via the first communication channel by the mobile wallet computing system, a request from a second device to access the mobile wallet account, wherein the request from the second mobile device includes a destination address for storage of payment tokens; and
in response to the request from the second device to access the mobile wallet account, register the second mobile device with the mobile wallet account; and
automatically apply the user profile from the cloud-based memory unit to the second mobile device via the cloud-based network, wherein automatically applying the user profile comprises automatically sending the payment token associated with the first payment account to the second mobile device at the destination address for storage of the payment tokens without a user having to manually add the first payment account via the second mobile device such that the first payment account and the associated payment token are reflected in a mobile wallet application executed on the second mobile device without requiring further input from the user within the mobile wallet application.

8. The method of claim 7, further comprising:
receiving, by the mobile wallet computing system, as part of the user profile, a selection of a source payment account for the mobile wallet account; and
provisioning the source payment account to the second mobile device.

9. The method of claim 7, further comprising:
receiving, by the mobile wallet computing system, as part of the user profile, a selection of a default payment account from a list of payment accounts of the user eligible to participate in the mobile wallet account; and
applying the default payment account automatically to the second mobile device.

10. The method of claim 7, further comprising:
receiving, by the mobile wallet computing system, a selection of a wallet access code as part of the user profile;
assigning, by the mobile wallet computing system, the wallet access code to the mobile wallet account; and
receiving, by the mobile wallet computing system, via the network, the wallet access code from the second mobile device of the user for registering the second mobile device with the mobile wallet account.

11. The method of claim 7, further comprising:
receiving, by the mobile wallet computing system, an update to the user profile from the second mobile device; and
applying the update automatically, by the mobile wallet computing system, to the first mobile device.

12. A method, comprising:
receiving, by a mobile wallet computing system of a mobile wallet provider, a selection of a wallet access code for creating a mobile wallet account;
receiving, by the mobile wallet computing system via a first communication channel, a selection of a default payment account for creating the mobile wallet account, wherein the first communication channel comprises a communication channel between a mobile banking interface website and a cloud-based processing unit;
creating, by the mobile wallet computing system, a user profile and associating the wallet access code and the default payment account with the user profile;
storing, by the mobile wallet computing system, the user profile on the cloud-based memory unit;
associating, by the mobile wallet computing system, the user profile with the mobile wallet account;
making the user profile accessible, by the mobile wallet computing system, via a cloud-based network, to a first mobile device upon registering the first mobile device with the mobile wallet account;
receiving, by the mobile wallet computing system from the first device of a user, a request to add a first payment account to the mobile wallet account;
in response to the request to add the first payment account, updating, by the mobile wallet computing system, the user profile to include the first payment account, wherein updating the user profile comprises creating a payment token associated with the first payment account and sending the payment token to the first device;

storing, by the mobile wallet computing system, the updated user profile on the cloud-based memory unit, wherein the updated user profile includes the first payment account and the payment token associated with the first payment account;
receiving, by the mobile wallet computing system via a second communication channel, a request from a second device of the user to access the mobile wallet account, wherein the request from the second device includes a destination address for storage of payment tokens, wherein the second communication channel comprises a communication channel between an interface of a mobile wallet client application on the first mobile device and a cloud-based processing system, wherein the second communication channel is established at a separate location and a distinct time from the first communication channel, and wherein the request for registration of the first mobile device with the mobile wallet account further comprises user authentication information received via the second communication channel;
authenticating, by the mobile wallet computing system, an operator of the first mobile device by matching the user authentication information received via the second communication channel to user information received from the registration terminal via the first communication channel;
in response to, at least in part, successful authentication of the operator of the first mobile device and in response to the request from the second mobile device to access the mobile wallet account, register the second device with the mobile wallet account using the second communication channel between the mobile wallet client application on the first mobile device and the cloud-based processing unit; and
automatically apply the user profile from the cloud-based memory unit to the second device via the cloud-based network, wherein automatically applying the user profile comprises automatically sending the payment token associated with the first payment account to the second device at the destination address for storage of the payment tokens without the user having to manually add the first payment account via the second device such that the first payment account and the associated payment token are reflected in a mobile wallet application executed on the second device without requiring further input from the user within the mobile wallet application.

13. The method of claim 12, further comprising:
storing, by the mobile wallet computing system, the user profile in a cloud based storage; and
making the user profile accessible, by the mobile wallet computing system, to the mobile device and other devices of the user that are registered to use the mobile wallet account.

14. The method of claim 12, further comprising:
receiving, by the mobile wallet computing system, the wallet access code from another device of the user;
registering, by the mobile wallet computing system, the another device of the user to use the mobile wallet account; and
applying, by the mobile wallet computing system, the user profile to the another device.

* * * * *